United States Patent [19]

Yamamuro et al.

[11] Patent Number: 4,542,665

[45] Date of Patent: Sep. 24, 1985

[54] CONTROL SYSTEM FOR CONTINUOUSLY VARIABLE TRANSMISSION WITH SPACE SAVING AUTOMATIC CLUTCH CONTROL

[75] Inventors: Sigeaki Yamamuro, Zushi; Haruyoshi Kumura; Yoshikazu Tanaka, both of Yokohama; Keiju Abo; Hiroyuki Hirano, both of Yokosuka, all of Japan

[73] Assignee: Nissan Motor Co., Ltd., Yokohama, Japan

[21] Appl. No.: 543,840

[22] Filed: Oct. 20, 1983

[30] Foreign Application Priority Data

Oct. 22, 1982 [JP] Japan .................................. 57-184629
Sep. 9, 1983 [JP] Japan .................................. 58-165266

[51] Int. Cl.[4] ...................... B60K 41/12; B60K 41/18; B60K 41/10
[52] U.S. Cl. .................................. 74/866; 192/0.092; 192/0.096; 192/0.076; 74/867
[58] Field of Search ......................... 74/868, 867, 866; 192/0.092, 0.096, 0.03, 0.032, 0.044, 0.052, 0.075, 0.076, 0.08

[56] References Cited

U.S. PATENT DOCUMENTS

| | | | |
|---|---|---|---|
| 2,822,901 | 2/1958 | Förster | 192/0.096 |
| 4,109,772 | 8/1978 | Poore | 192/0.092 |
| 4,194,608 | 3/1980 | Usui et al. | 192/0.092 |
| 4,248,333 | 2/1981 | Matsumoto et al. | 192/0.092 X |
| 4,281,751 | 8/1981 | Suga et al. | 192/0.092 X |
| 4,343,387 | 8/1982 | Hofbauer | 74/866 X |
| 4,393,964 | 7/1983 | Kemper | 192/0.076 X |
| 4,438,664 | 3/1984 | Fiala | 192/0.096 X |
| 4,458,560 | 7/1984 | Frank et al. | 74/866 X |
| 4,466,521 | 8/1984 | Hattori et al. | 192/0.076 X |
| 4,478,105 | 10/1984 | Yamamuro et al. | 192/0.092 X |
| 4,487,303 | 12/1984 | Boueri et al. | 192/0.092 X |
| 4,499,793 | 2/1985 | Jow et al. | 74/866 |

Primary Examiner—George H. Krizmanich
Assistant Examiner—Dirk Wright
Attorney, Agent, or Firm—Schwartz, Jeffery, Schwaab, Mack, Blumenthal & Evans

[57] ABSTRACT

A starting valve has a start fluid pressure regulating state and a complete engagement fluid pressure regulating state and supplies a regulated fluid pressure to a hydraulic clutch. A shift operating mechanism comprises a rod movable within a reduction ratio select range and an overstroke range. A complete engagement control valve has a spool operatively connected with the rod. When the rod is disposed within the reduction ratio select range, the complete engagement control valve renders the starting valve operable in the complete engagement fluid pressure regulating state, while when the rod is disposed within the overstroke range, the complete engagement control valve renders the starting valve operable in the start fluid pressure regulating state.

10 Claims, 34 Drawing Figures

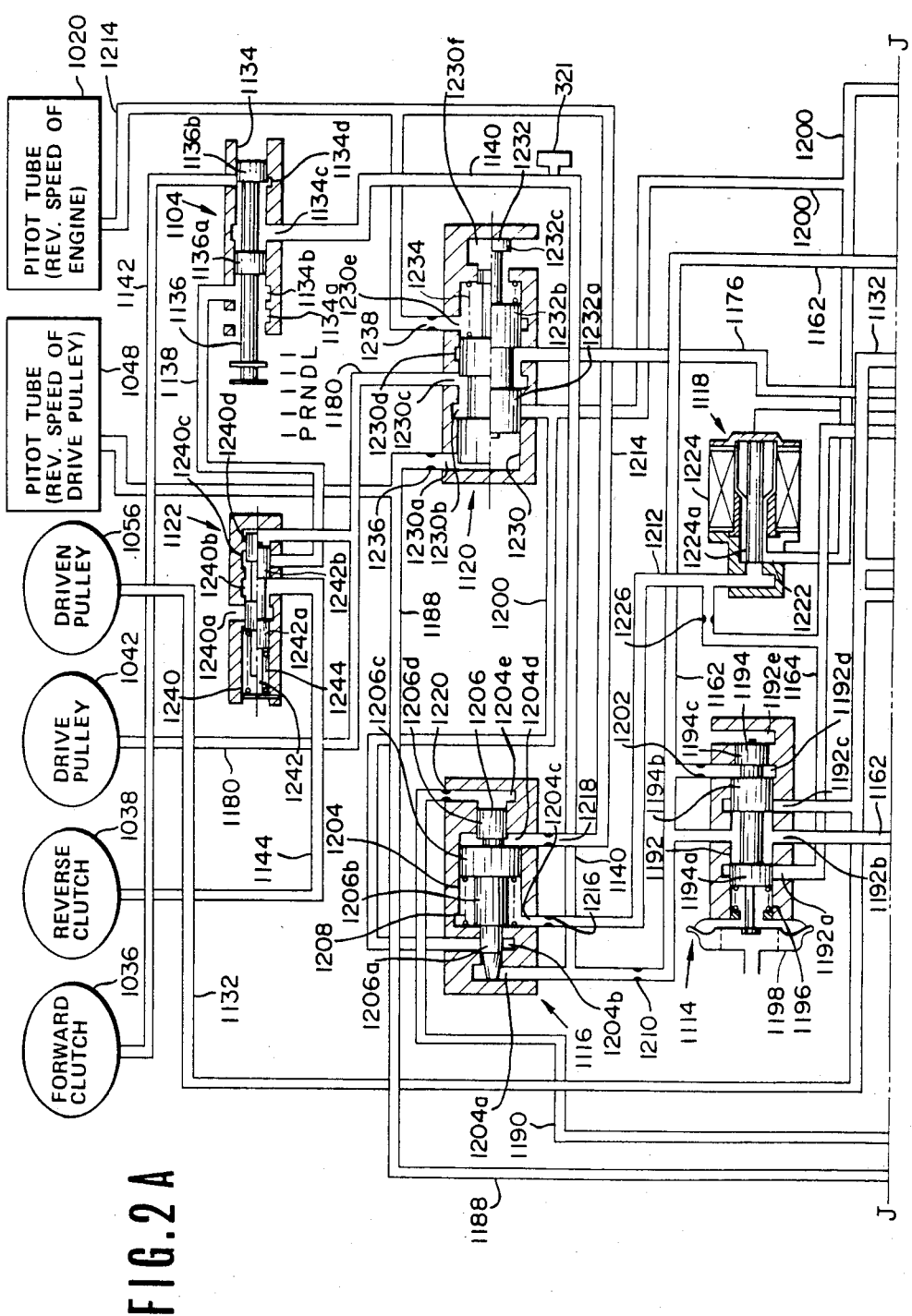

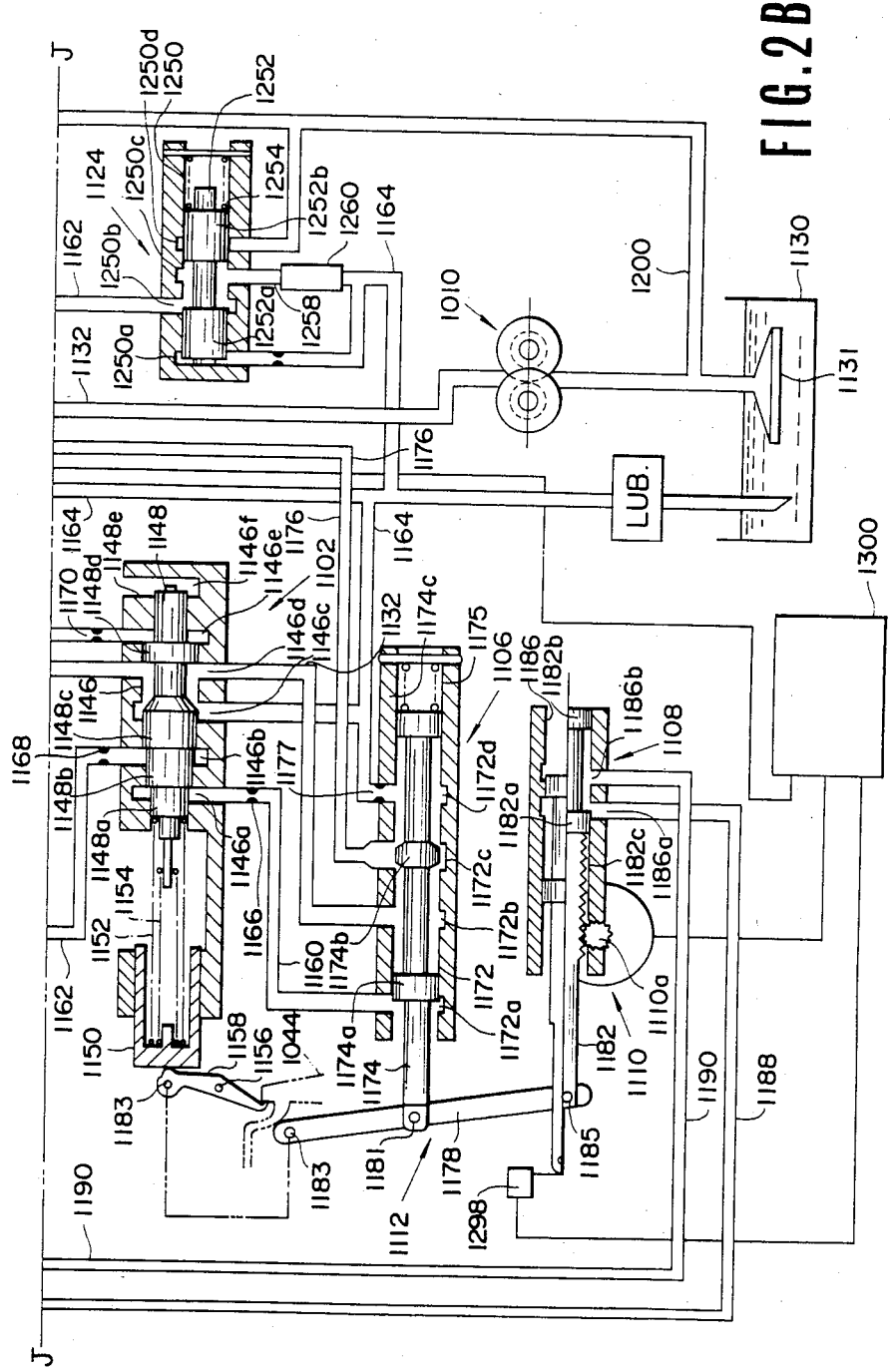

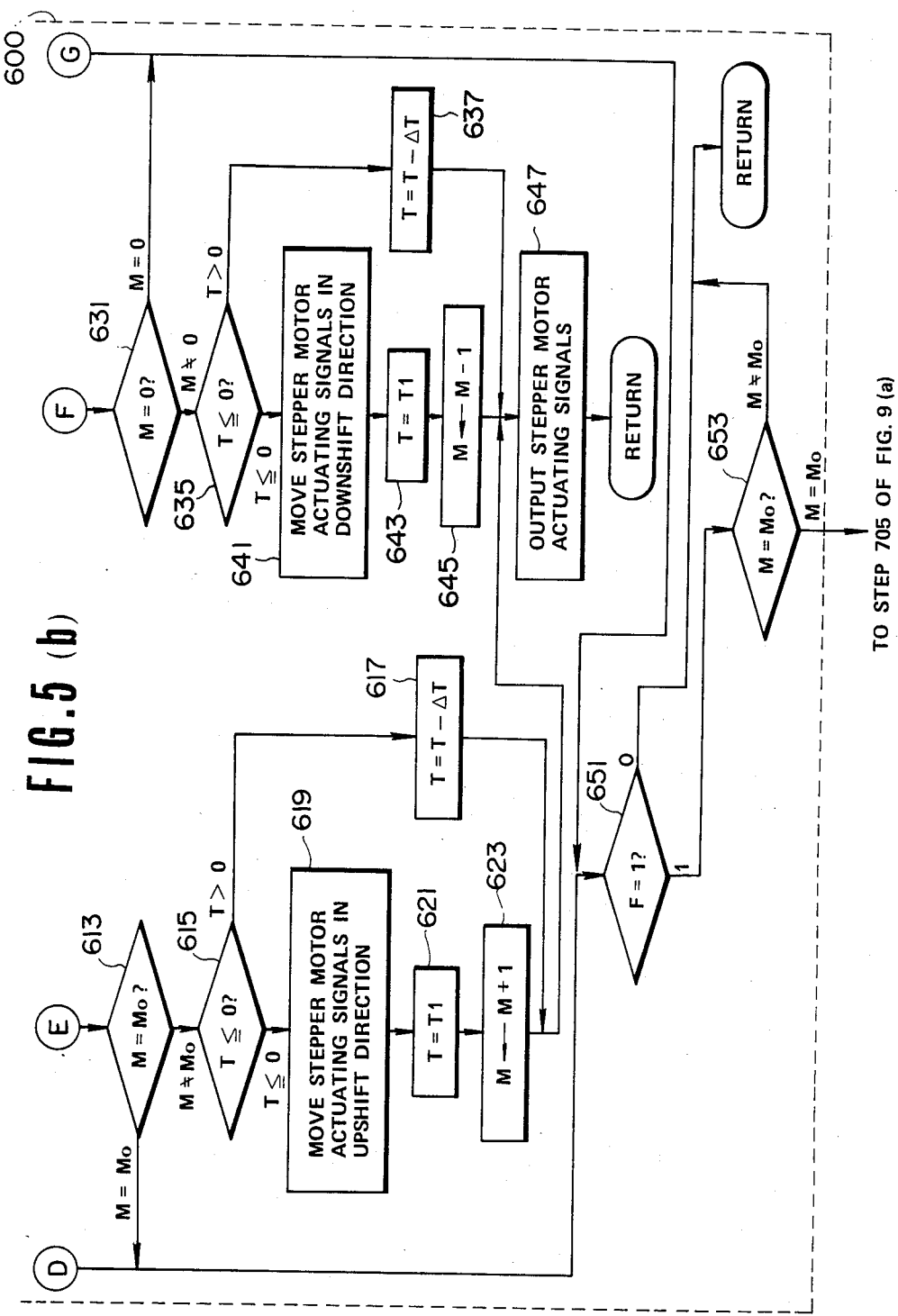

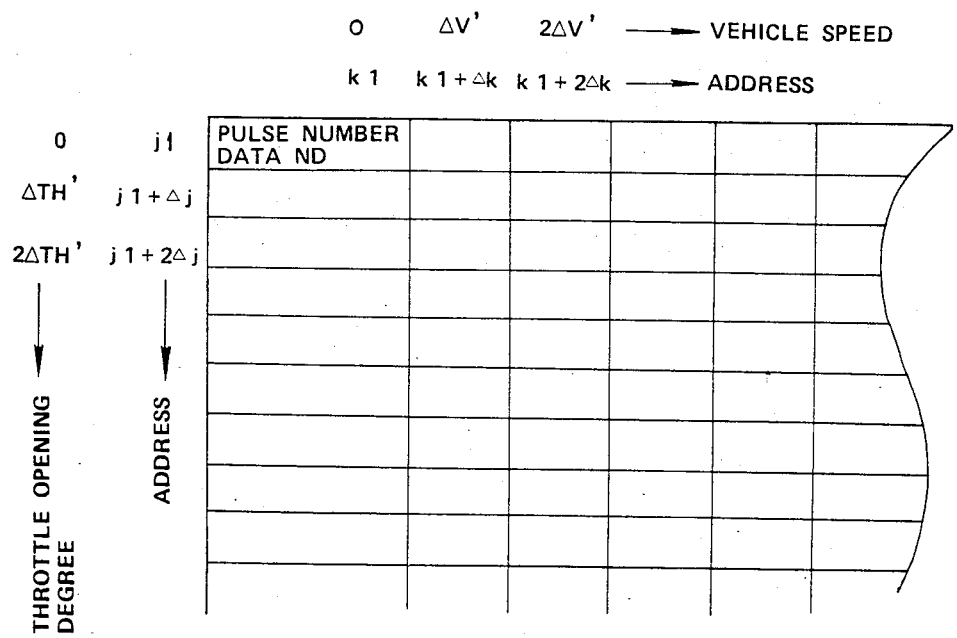

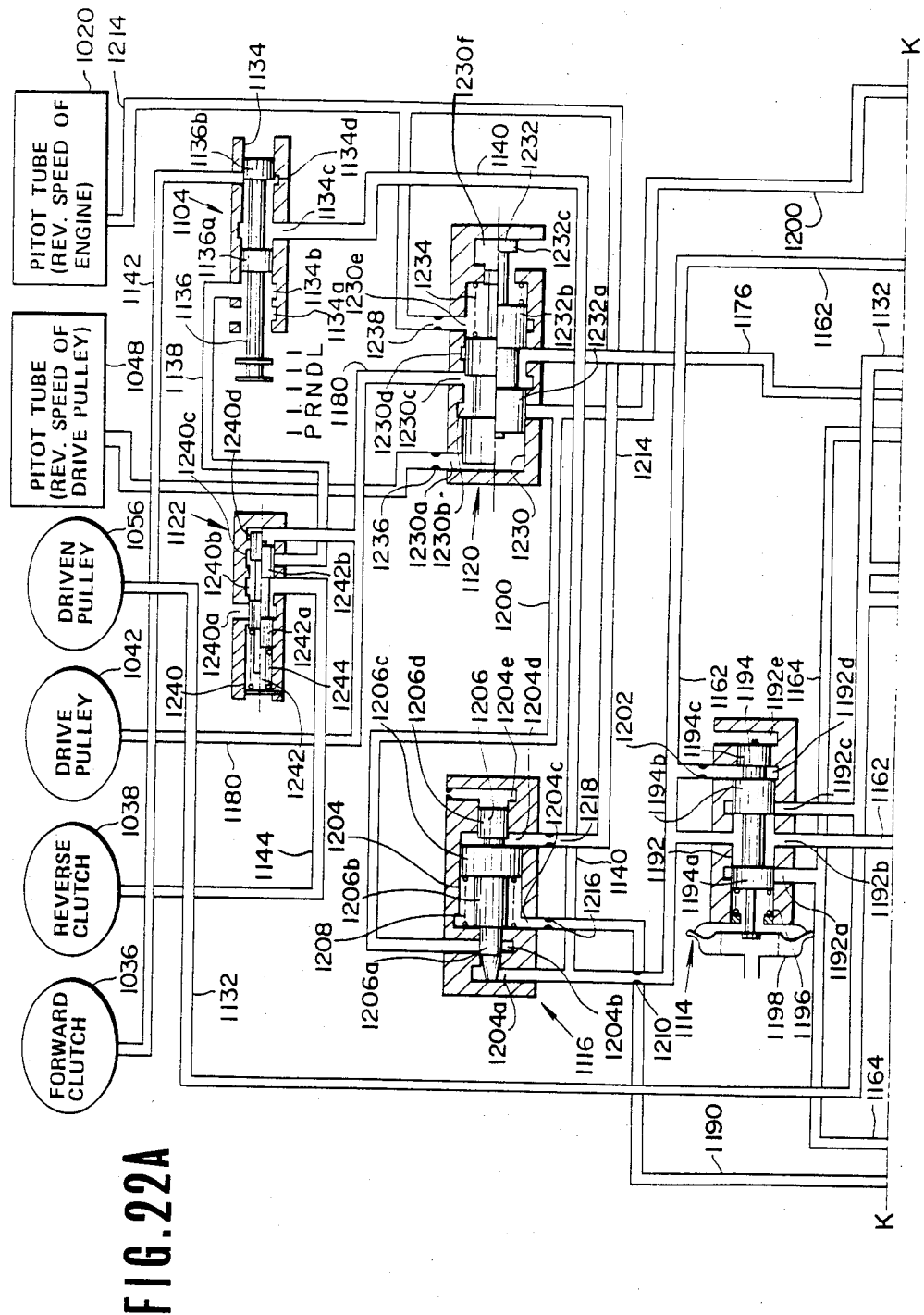

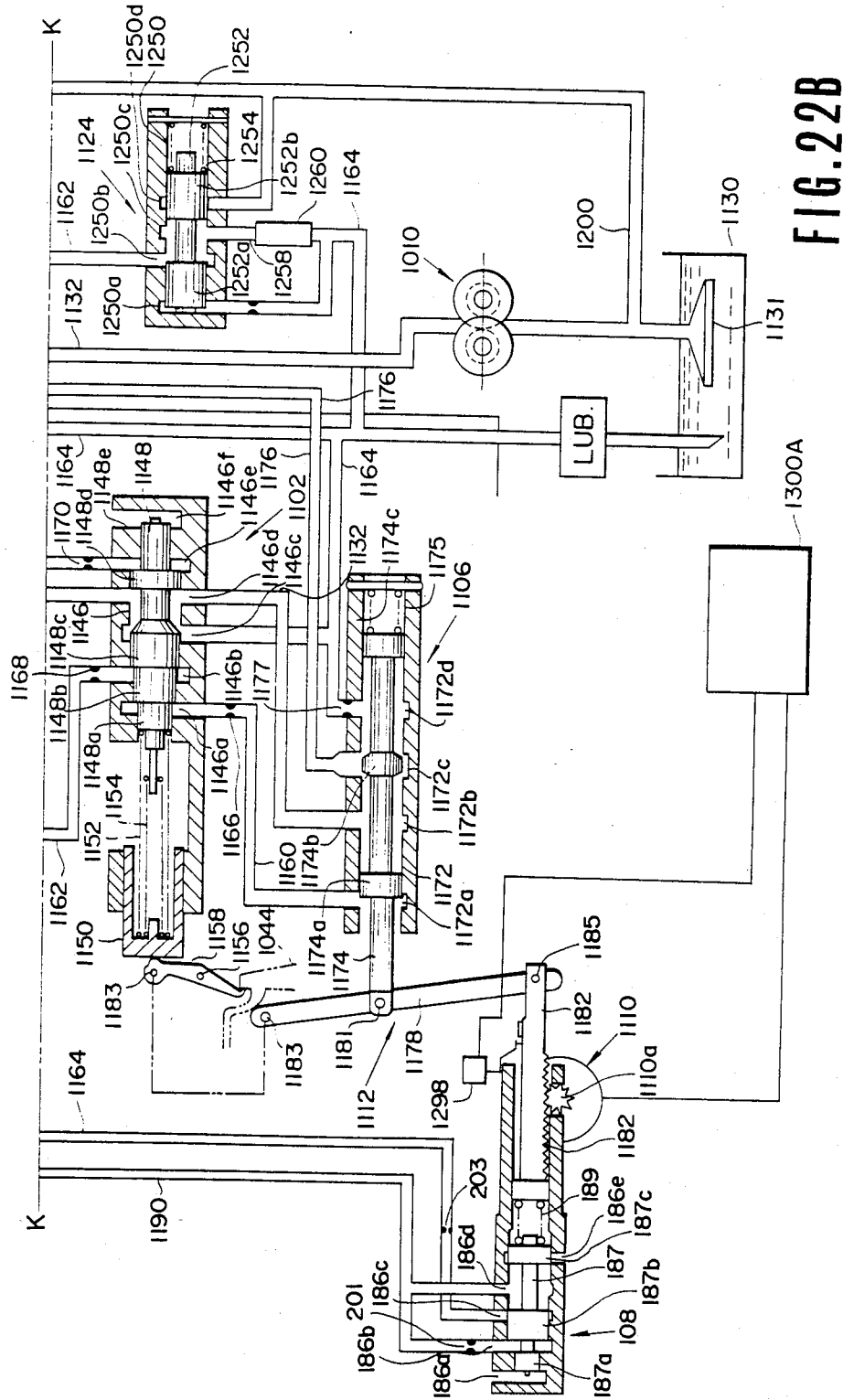

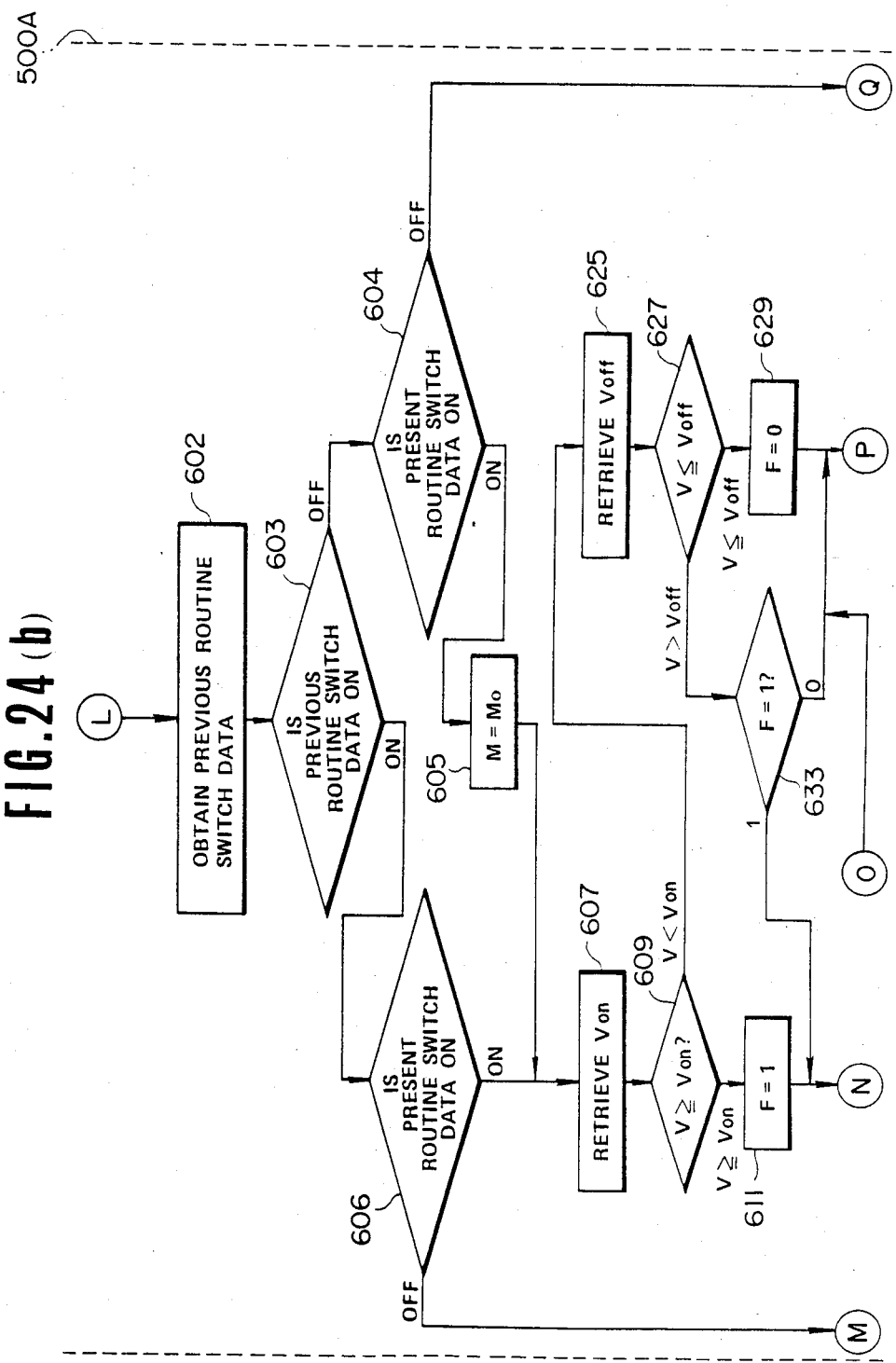

CONTROL SYSTEM FOR CONTINUOUSLY VARIABLE TRANSMISSION WITH SPACE SAVING AUTOMATIC CLUTCH CONTROL

CROSS REFERENCE TO RELATED APPLICATIONS

Reference is made to a co-pending U.S. patent application Ser. No. 489,600 filed Apr. 28, 1983. References are also made to the following related co-pending applications, each filed by the same applicants concurrently with the present application: U.S. patent application Ser. No. 543,838 filed Oct. 20, 1983 U.S. patent application Ser. No. 543,839 filed Oct. 20, 1983 U.S. patent application Ser. No. 544,071 filed Oct. 20, 1983 and U.S. patent application Ser. No. 544,066 filed Oct. 20, 1983.

BACKGROUND OF THE INVENTION

The present invention relates to a control system for a continuously variable transmission, and more particularly to a hydraulic control system having a hydraulic automatic clutch control.

In controlling a hydraulic automatic clutch of a vehicle, the clutch must be engaged smoothly for starting the vehicle. One of measures to meet this requirement is to increase a fluid pressure supplied to the hydraulic clutch in response to a revolution speed of an engine. This provides as smooth starting of the vehicle as the use of a centrifugal clutch does. However, the use of the fluid pressure variable as above poses a problem that the vehicle can not continue to travel during operation at engine speeds below a predetermined value because the clutch is released or put into a half engaged state whenever the engine speed drops below the predetermined value. This problem derives from the fact the fluid pressure variable with the engine revolution speed is used as the actuating pressure for the hydraulic clutch. For the purpose of better fuel economy, it is preferrable to operate a vehicle at lower engine revolution speeds and with a smaller reduction ratio. However, operating the vehicle in this manner is not feasible without solving the above mentioned problem.

In order to solve the problem above, the applicants have proposed in the co-pending U.S. patent application Ser. No. unknown concurrently filed and assigned herewith a control system for a hydraulic automatic clutch wherein a start adjustement valve supplies a starting valve with a start adjustment fluid pressure as applied against a fluid pressure indicative of a revolution speed of an engine so as to render the starting valve operable in a start fluid pressure regulating state. In the start fluid pressure regulating state, the starting valve generates a fluid pressure, which may be called as "a start fluid pressure," which is unchanged irrespective of a variation in idle speed of the engine. This fluid pressure is supplied to the hydraulic clutch so as to keep the clutch in a predetermined pre-engaged state. This proposed system also comprises a complete engagement control valve which selectively supplies a fluid pressure, which may be called as "a complete engagement fluid pressure," to the starting valve so as to render the starting valve operable in a complete engagement fluid pressure regulating state. When it is put into the complete engagement fluid pressure regulating state, the starting valve generates a fluid pressure higher than the start fluid pressure so as to assure complete engagement of the clutch even if the revolution speed of the engine drops.

SUMMARY OF THE INVENTION

According to the present invention, there is provided a control system for a hydraulic automatic clutch of a continuously variable transmission, comprising:
  a source of pressurized fluid;
  a shift control valve communicating with the source and having a spool movable for controlling a shift between reduction ratios in the continuously variable transmission;
  a shift operating mechanism including a rod movable within a first range and a second range,
  the shift operating mechanism including means operatively connected with the rod and the spool for controlling the spool of the shift control valve so as to continuously vary a reduction ratio between the largest reduction ratio and the smallest reduction ratio in response to movement of the rod within the first range;
  control means for actuating the rod;
  a starting valve having a start fluid pressure regulating state and a complete engagement fluid pressure regulating state, the starting valve supplying to he hydraulic automatic clutch a first regulated fluid pressure when it is in the start fluid pressure regulasting state, the starting valve supplying a second regulated fluid pressure when it is in the complete engagement fluid pressure regulating state; and
  means operatively connected with the rod for rendering the starting valve operable in the start fluid pressure regulating state when the rod is disposed within the second range and for rendering the starting valve operable in the complete engagement fluid pressure regulating state when the rod is disposed in the first range.

An object of the present invention is to provide a control system for a hydraulic automatic clutch which can be installed in a space saving manner with little cost increase in a hydraulic control system for a continuously variable transmission.

BRIEF DESCRIPTION OF THE DRAWINGS

FIGS. 2A and 2B, when combined, illustrate a hydraulic control system, including a control system for a hydraulic automatic clutch, for the continuously variable V-belt transmission;

FIG. 11 is a diagrammatic view illustrating how pulse number data ND are stored in a matrix in the ROM 314 versus throttle opening degree TH and vehicle speed V;

FIG. 12 is a chart illustrating various modes of stepper motor actuating signals applied to output leads 317a, 317c, 317b and 317d of the stepper motor 1110;

FIGS. 22A and 22B are similar views to FIGS. 2A and 2B and illustrate a second embodiment of a control system which does not utilize a start adjustment valve with a force motor;

DETAILED DESCRIPTION OF THE INVENTION

Figure 1:
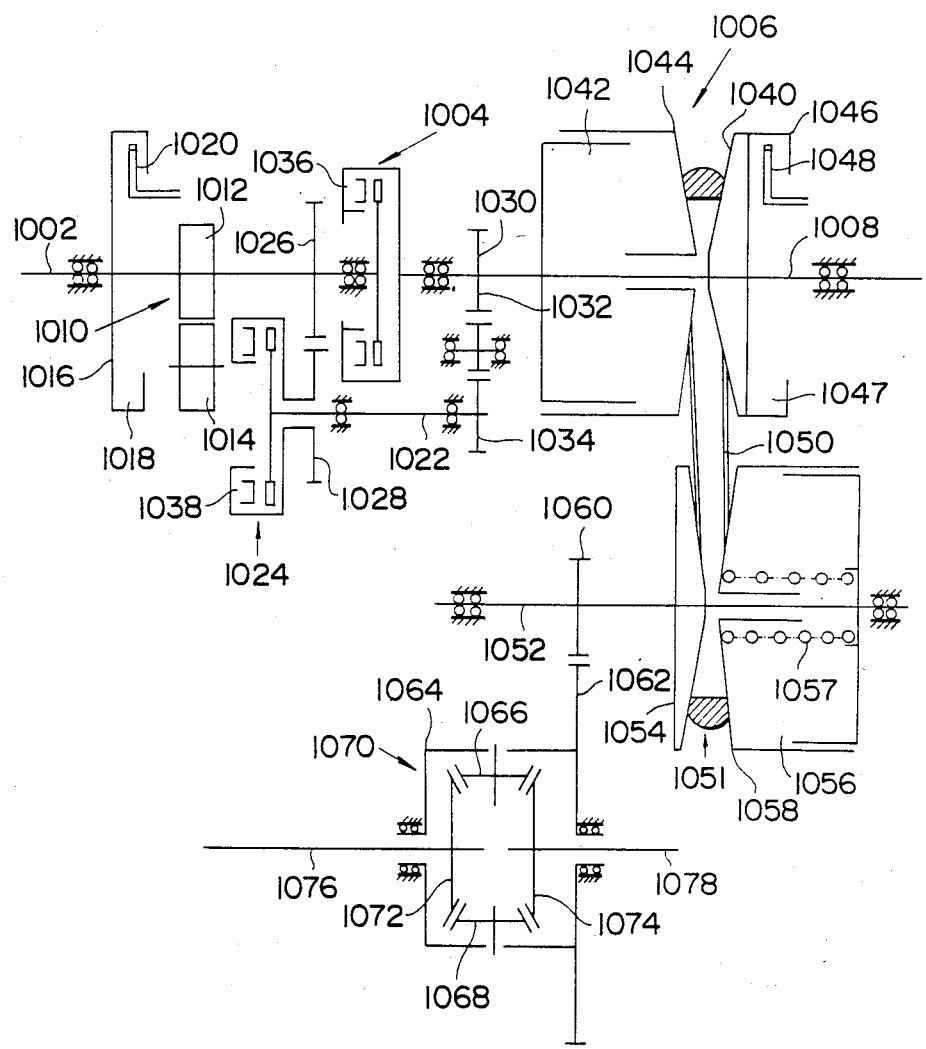
FIG. 1 is a diagrammatic view of a transmission mechanism of a continuously variable V-belt transmission.
Figure 3:
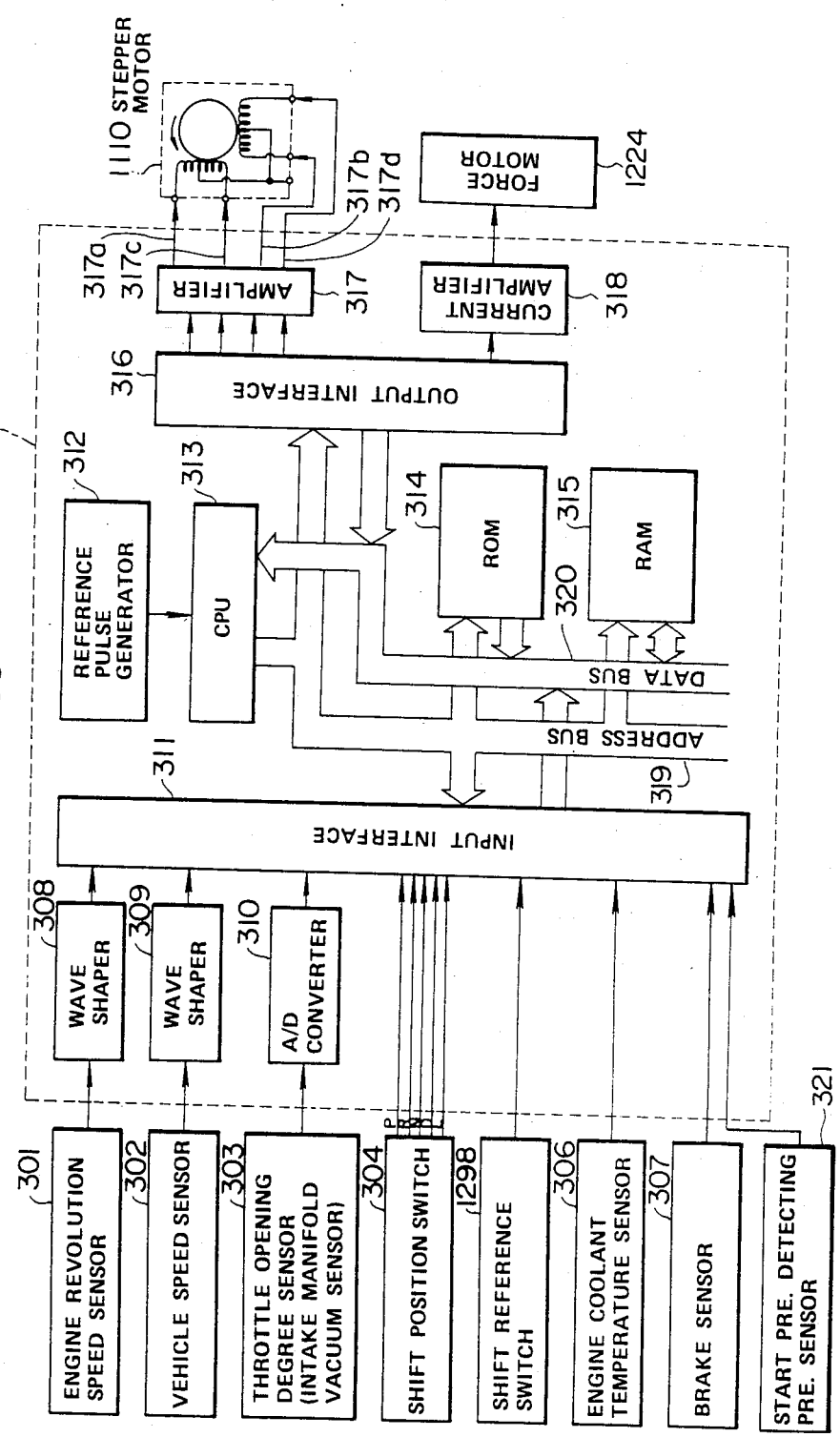
FIG. 3 is a block diagram showing an electronic control unit 1300 for controlling a stepper motor 1110 and a force motor 1224 shown in FIGS. 2A and 2B.
Figure 4:
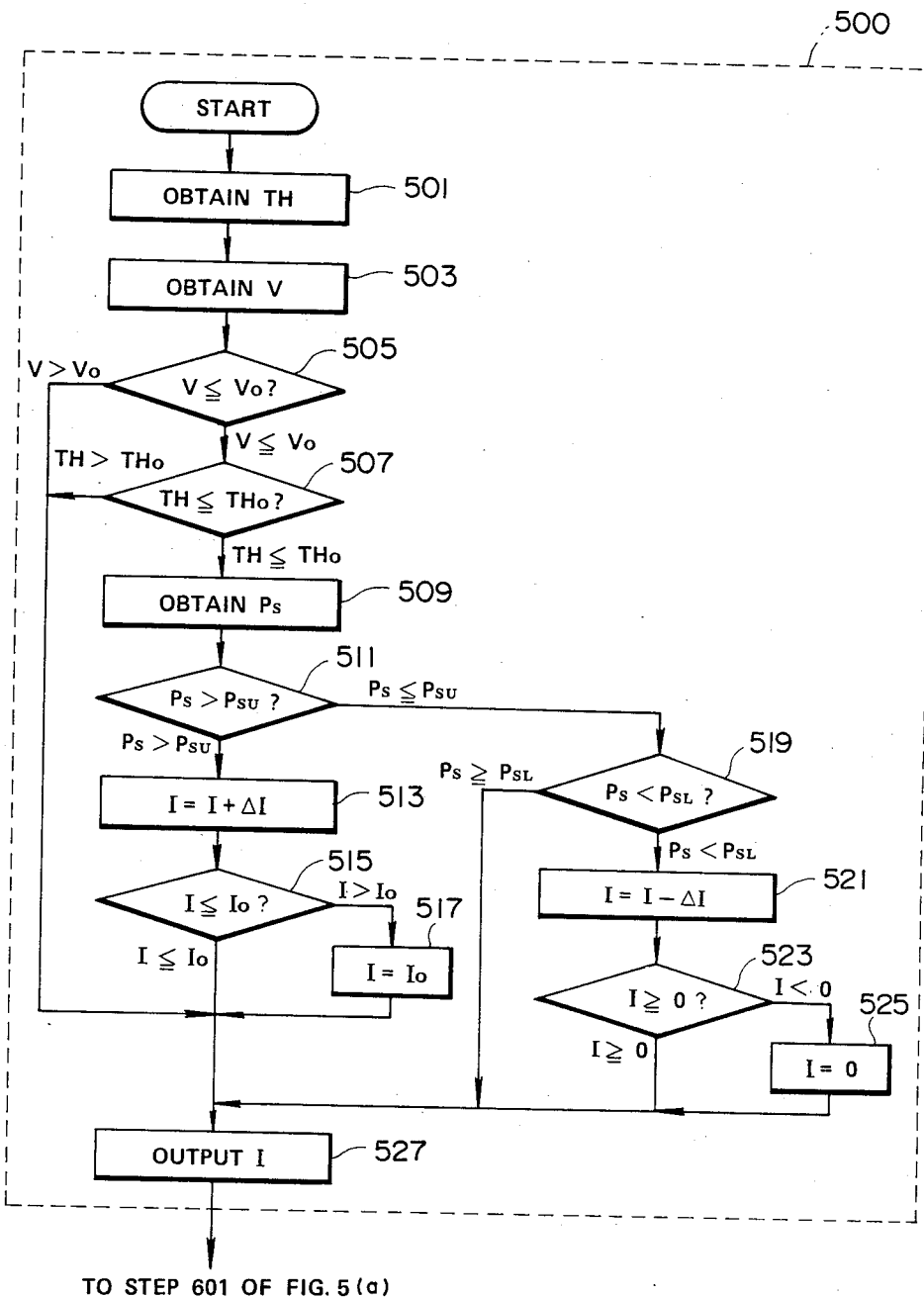
FIG. 4 is a flowchart of a force motor control routine 500 of the control system for the automatic clutch.
Figure 5:
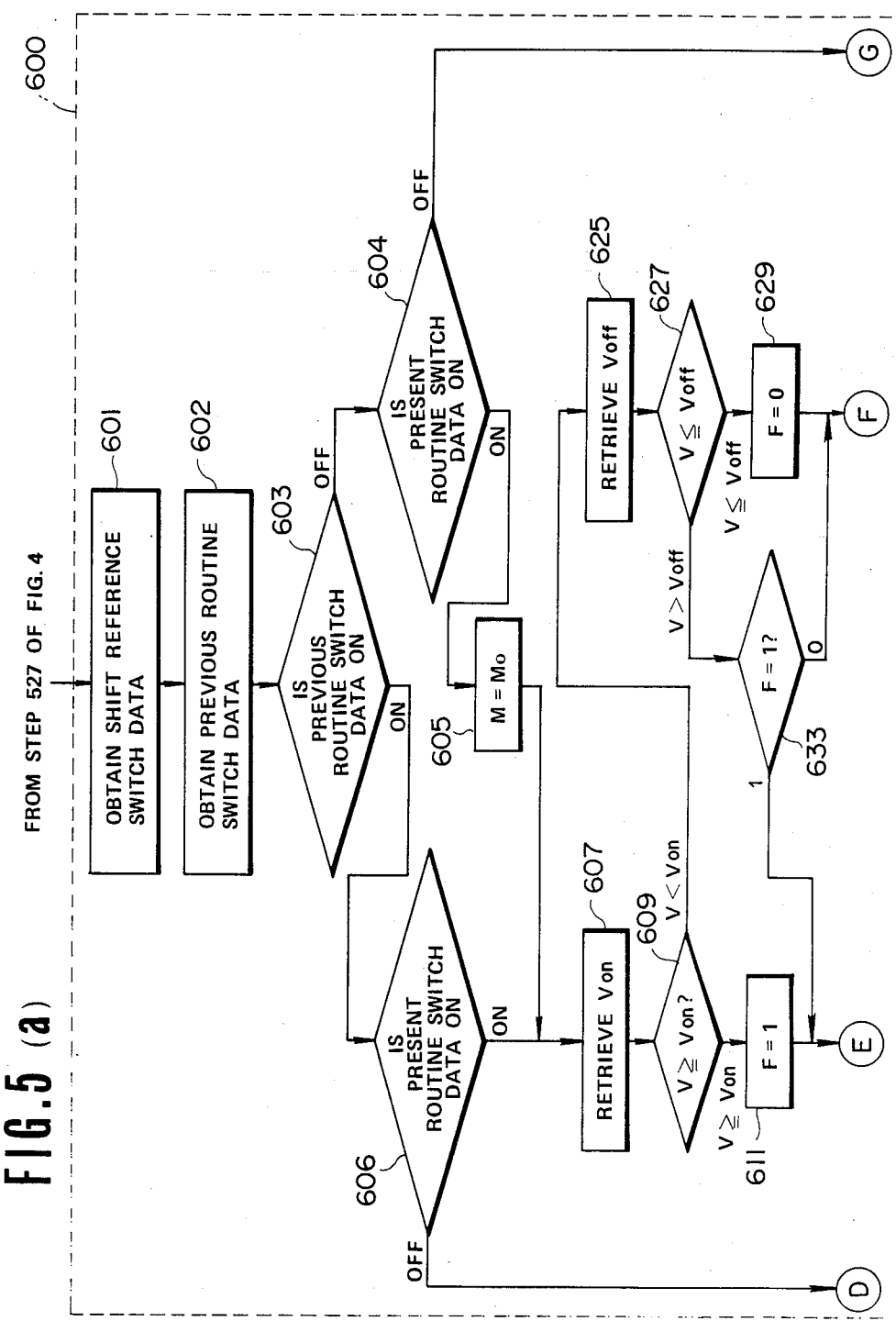
FIGS. 5(a) and 5(b), when combined, illustrate a flowchart of a complete engagement control routine 600.
Figure 6:
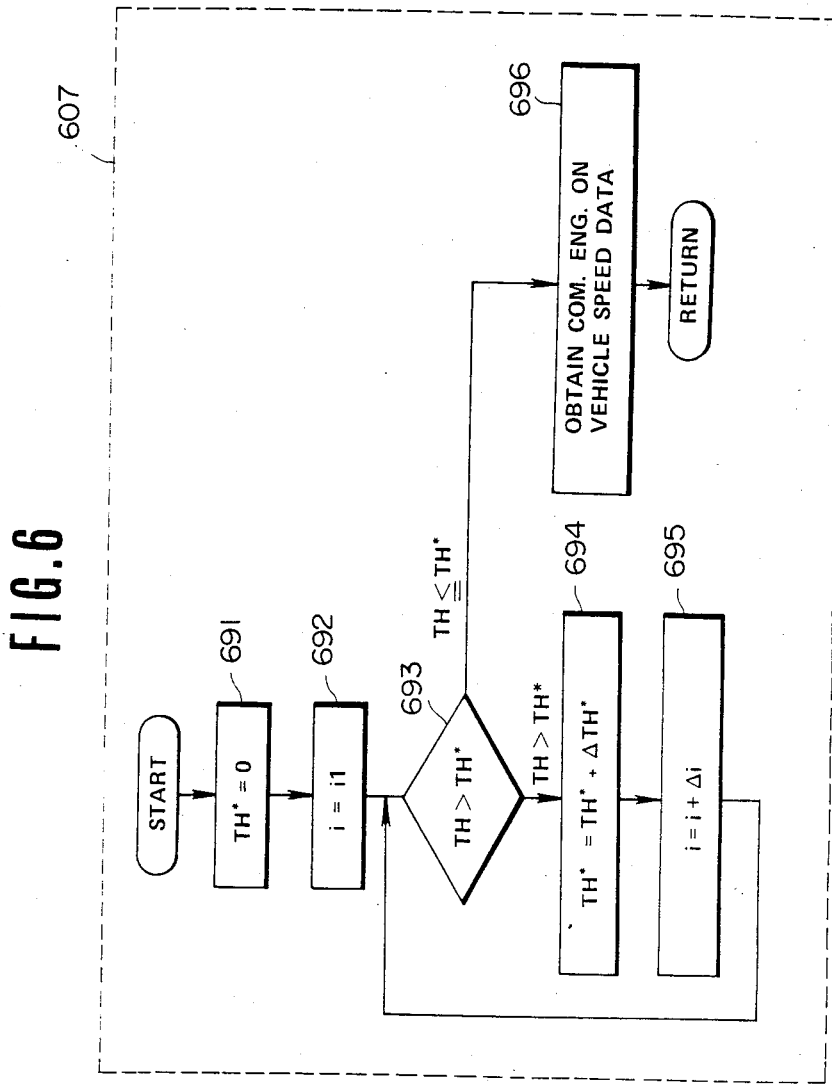
FIG. 6 is a flowchart of a data retrieval routine 607 for complete engagement on vehicle speed Von data.
Figure 7:
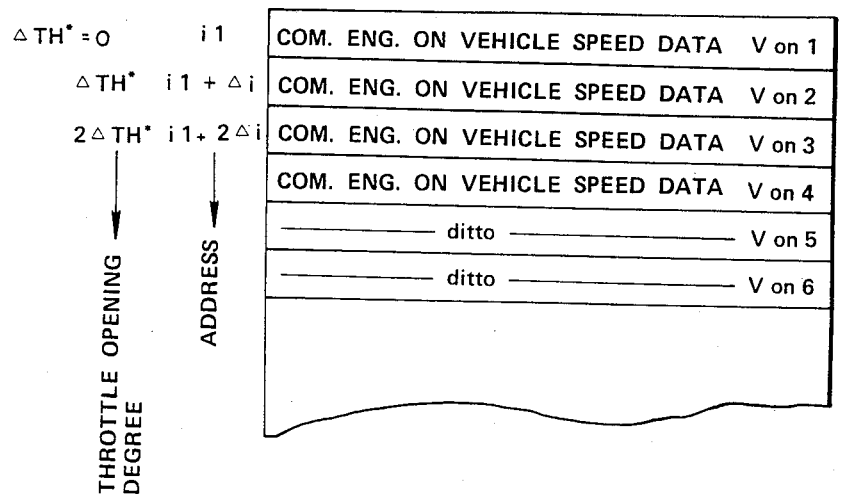
FIG. 7 is a diagrammatic view illustrating how the complete engagement on vechile speed data Von are stored in a ROM 314 shown in FIG. 3.
Figure 8:
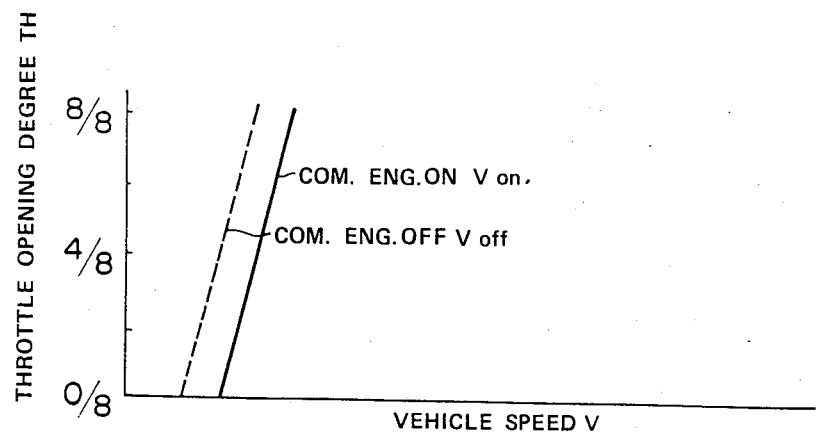
FIG. 8 is a graph showing the relationship between the complete engagement on vehicle speed Von and the complete engagement off vehicle speed Voff.
Figure 24:
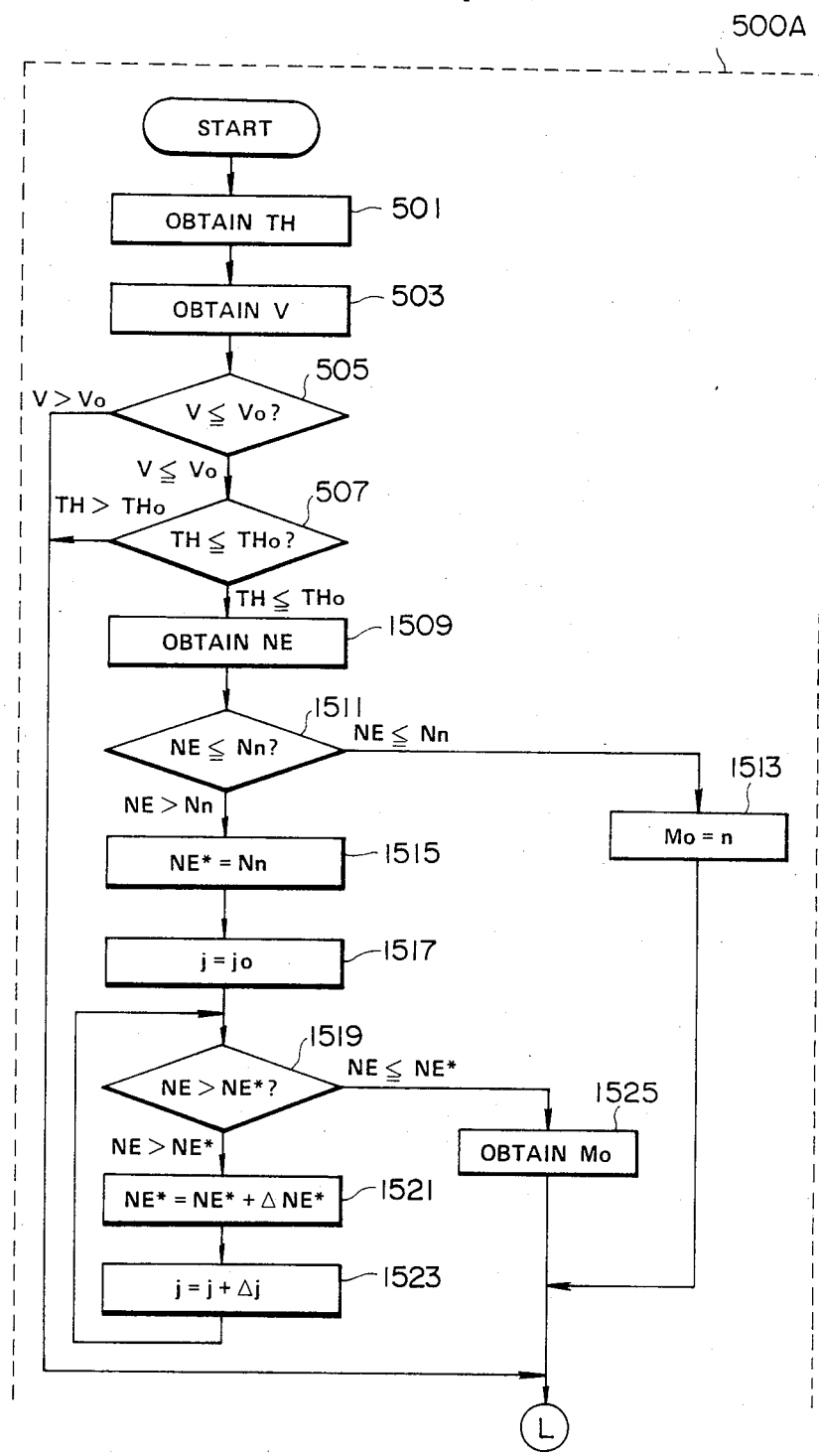
FIGS. 24(a), 24(b) and 24(c), when combined, illustrate a flowchart of a start and complete engagement control routine 500A used in the second embodiment.
Figure 24C:
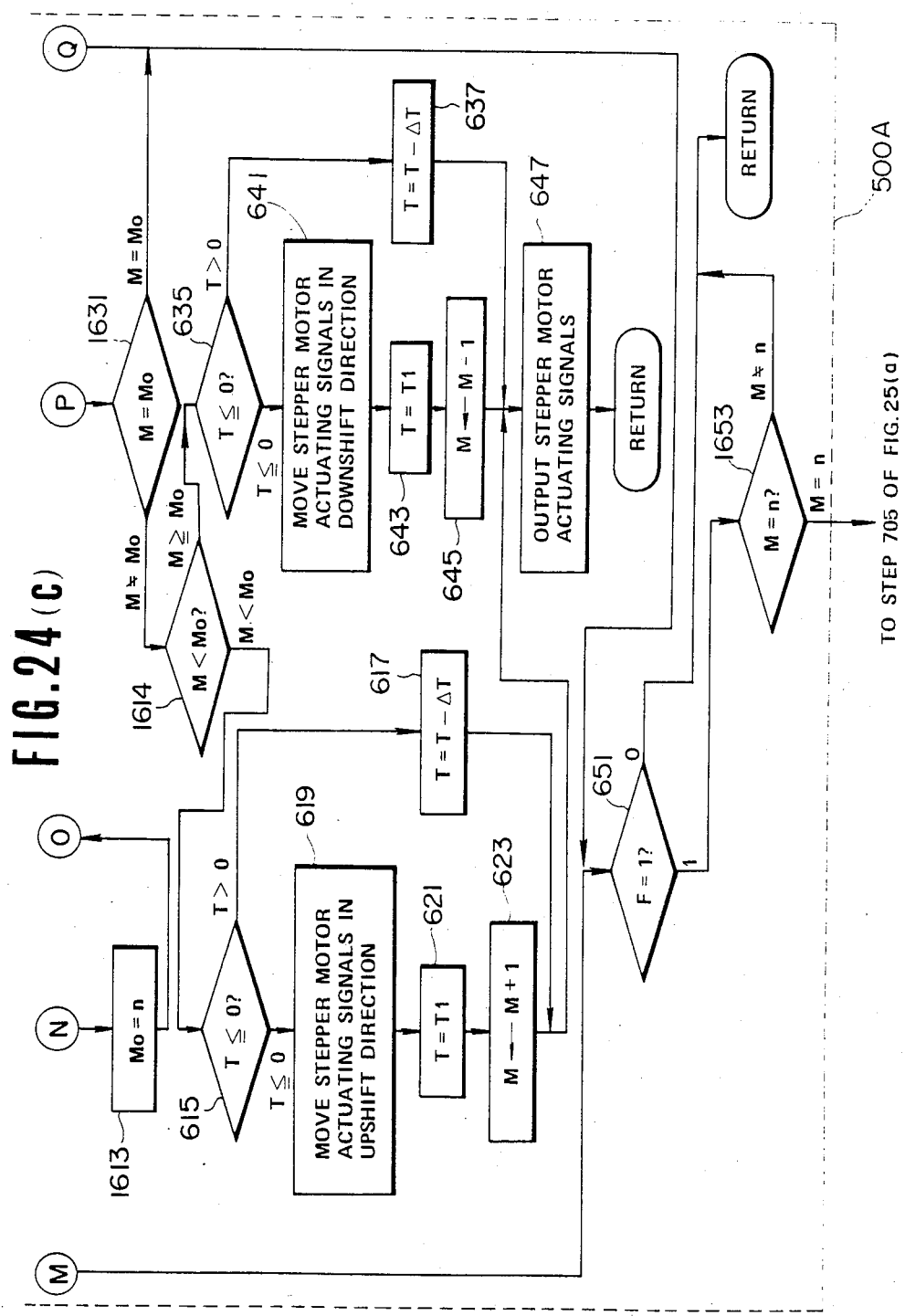
Figure 25A:
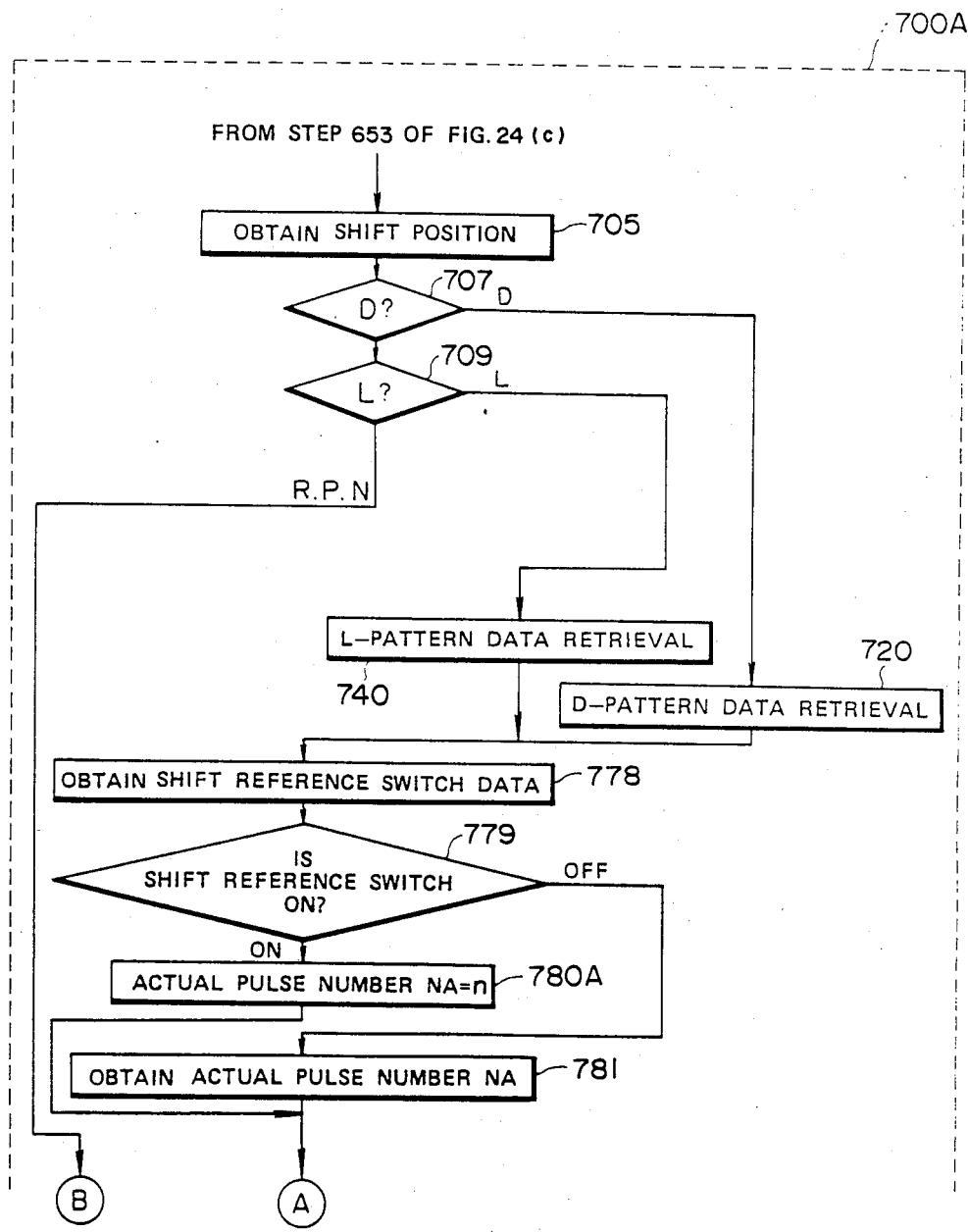
FIGS. 25(a) and 25(b), when combined, illustrate a flowchart of a stepper motor control routine 700A used in the second embodiment.
Figure 25B:
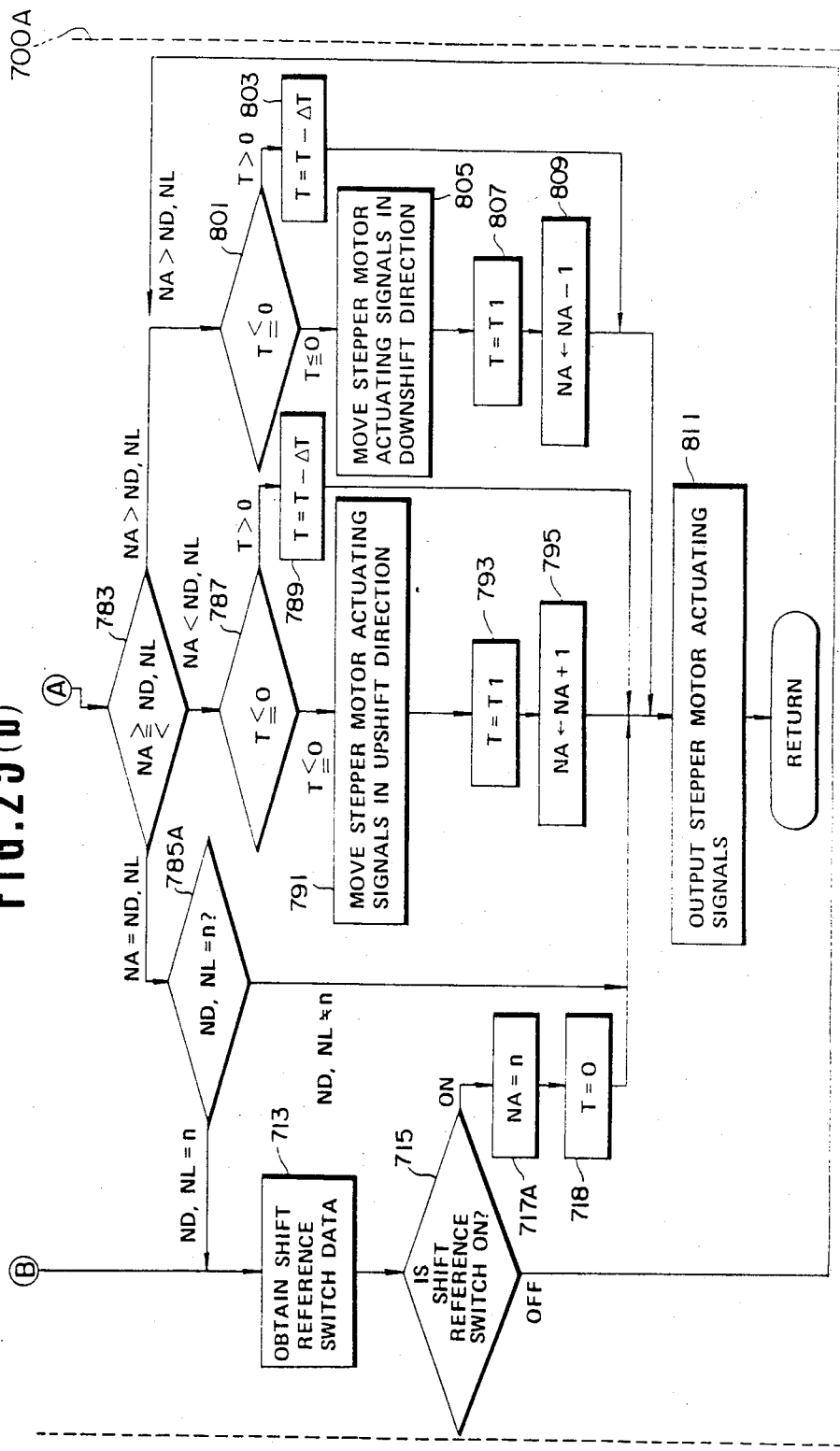

Referring to FIGS. 1, 2A and 2B, the transmission mechanism and the hydraulic control system used in a first embodiment according to the present invention are illustrated. The description thereof is found in the co-pending U.S. patent application Ser. No. 489,600 filed Apr. 28, 1983 (see FIGS. 24, 25A and 25B) by the same applicants and commonly assigned herewith. That portion of the disclosure of this co-pending application which relates to FIGS. 24, 25A and 25B is incorporated hereby by reference in its entirety. Referring to FIGS. 2A and 2B, a stepper motor 1110 and a force motor 1224 are controlled by an electronic control unit 1300. Referring to FIGS. 3 through 21, the construction and operation of this electronic control unit 1300 in relation to the stepper motor 1110 and force motor 1224 are illustrated. The description thereof is found in the co-pending U.S. patent application Ser. No. unknown, entitled "CONTROL SYSTEM FOR HYDRAULIC AUTOMATIC CLUTCH" filed by the same applicants as those of the present application concurrently with the present application and claiming priorities on four Japanese patent applications Nos. 57-184627, 58-40808, 58-70095 and 58-92418. This co-pending application is incorporated hereby by reference in its entirety. Particularly, attention is directed to the description along with FIGS. 3 through 21.

Referring to FIGS. 2A and 2B, a clutch complete engagement control valve 1108 and its associated starting valve 1116 which form part of the present invention are now described.

The clutch complete engagement control valve 1108 has a spool integral with a rod 1182 of a shift operating mechanism 1112. The rod 1182 is actuatable by the stepper motor 1110. The stepper motor 1110 switches the clutch complete engagement control valve 1108 in a shift patter shown in FIG. 8 when the electronic control unit 1300 executes the steps of the complete engagement control routine 600 shown in FIGS. 5(a) and 5(b). That is, the clutch complete engagement control valve 1108 is moved to the position indicated by the upper half thereof as viewed in FIG. 2B when the vehicle speed drops below the complete engagement vehicle off speed Voff, while it is moved back to the position indicated by the bottom half thereof as viewed in FIG. 2B when the vehicle speed exceeds the complete enmgagement on vehicle speed Von. Therefore, during operation at low vehicle speeds (i.e., during starting of the vehicle), a port 1186b (i.e., an oil conduit 1190) of the clutch complete engagement control valve 1108 is drained, and thus a port 1204e of a starting valve 1116 is drained also. Under this condition, the valve 1116 is in a start oil pressure regulating state and generates a start pressure in a port 1204a as a result of pressure regulation in response to an engine revolution speed indicative oil pressure signal acting in a port 1204d and a start adjustment pressure acting in a port 1204c. This start pressure is supplied via a manual valve 1104 to a forward clutch 1004 (or a reverse clutch 1024). As the throttle opening degree TH increases, the start pressure increases in response to the engine revolution speed to put the clutch engaged. As the starting operation of the vehicle progresses and the vehicle speed exceeds the predetermined vehicle speed (the complete engagement on vehicle speed Von shown in FIG. 8), the clutch complete engagement control valve 1108 switches to a position wherein the port 1186a is now allowed to communicate with the port 1186b, thus allowing the drive pulley revolution speed indicative oil pressure signal to be supplied to the port 1204e of the starting valve 1116 through the oil conduit 1190. As a result, the starting valve 1116 is put into a complete engagement oil pressure regulating state and the oil pressure (start pressure) in the port 1204a regulated by the starting valve 1116 is elevated rapidly, causing a completele engagement of the forward clutch 1004 (or the reverse clutch 1024). The high level start pressure is maintained even if the engine revolution speed drops as long as the vehicle speed does not drop below the complete engagement off vehicle speed Voff (see FIG. 8). Therefore, the clutch is kept completely engaged to allow the vehicle to continue to travel at low engine revolution speeds. Subsequently, if the vehicle speed drops below the complete engagement off vehicle speed Voff shown in FIG. 8, the clutch complete engagement control valve 1108 switches back to the position as indicated by the upper half thereof as viewed in FIG. 2B, causing a drop in the start pressure. Since under this condition the clutch is released or put into a predetermined half engaged state, the engine is prevented from stalling.

As will now be understood, according to the first embodiment described, the complete engagement is controlled by the stepper motor 1110 which has a primary function of controlling a shift between reduction ratios, and thus the control system for the automatic clutch control can be installed in a space saving manner with little cost.

Although in the first embodiment, for the production of the start adjustment pressure, a start adjustment valve 1118 operated by a force motor 1224 is required, the force motor 1224 is bulky and accurate operation of thereof is not fully assured over a wide range of variation in oil temperature unless there is provided a temperature compensation circuit. For the purpose of suppressing cost increase and space saving, an object of the second embodiment which will now be described hereinafter is to eliminate the start adjustment valve 1118 having the force motor 1224.

Figure 26:
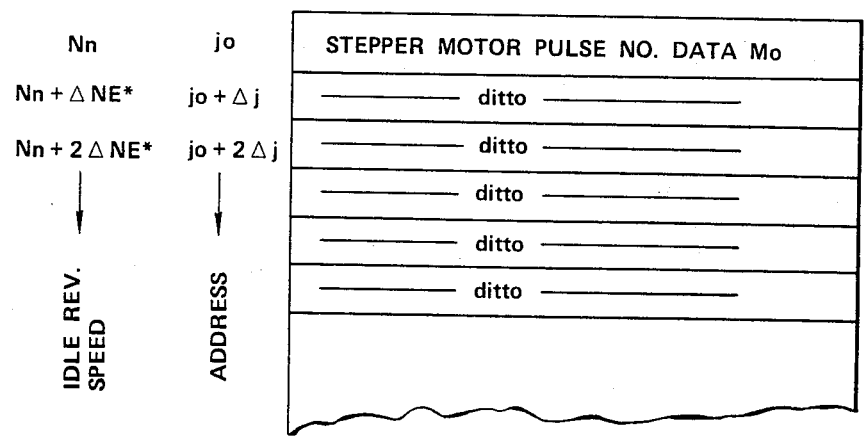
FIG. 26 is a similar view to FIG. 7 illustrating how the stepper motor pulse number data Mo are stored in a ROM 314 shown in FIG. 23.

Referring to FIGS. 22A, 22B, 23, 24(*a*), 24(*b*), 24(*c*), 25(*a*), 25(*b*), 26 and 27, the second embodiment is described. This embodiment is substantially similar to the first embodiment, but is different in that instead of the complete engagement control valve 1108 and start adjustment valve 1118 (see FIGS. 2A and 2B), a single start adjustment and complete engagement control valve 108 is provided as shown in FIG. 22B. Another difference is in that a shift control unit or an electronic control unit 1300A is used which contains in its ROM 314 a start and complete engagement control routine 500A as shown in FIGS. 24(*a*), 24(*b*) and 24(*c*), a stepper motor control routine 25(*a*) and 25(*b*), and a memory portion that stores stepper motor pulse number data Mo versus idle revolution speed as shown in FIG. 26. It will be noted from FIG. 23 that since according to this second embodiment the start adjustment control routine 500 using the output Ps of the pressure sensor 321 is not used, the pressure sensor 321 is not necessary.

Referring to FIGS. 22A and 22B, the start adjustment and complete engagement control valve 108 is arranged coaxially with a rod 1182 of a shift operating mechanism 1112. The start adjustment and complete engagement control valve 108 has a valve bore 186 formed with five ports 186*a* to 186*e*, a spool 187 formed thereon with three lands 187*a* to 187*c*, and a spring disposed between the spool 187 and rod 1182. The ports 186*a* and 186*e* are drain ports, respectively. The ports 186*b* and 186*d* communicate via an oil conduit 1190 with a port 1204*c* of a starting valve 116. The port 186*c* is connected with an oil conduit 1164 which forms part of a lubrication circuit. The ports 186*b* and 186*c* are provided at their inlets with orifices 201 and 203, respectively. The spring 189 has a short free length such that the spring 189 begins to be compressed when the rod 1182 has moved from the smallest reduction ratio position to a predetermined position disposed near and prior to the largest reduction ratio position. This start adjustment and complete engagement control valve 108 has a function to provide, in the oil conduit 1190, a start adjustment pressure which varies in response to the force of the spring 189 by regulating an oil pressure supplied thereto from the oil conduit 1164. That is, a clearance of the port 186*c* is adjusted to a degree wherein the force of the spring 189 balances with the force derived from the application of oil pressure from the port 186*b* on a differential area between the lands 187*a* and 187*b*. Since, as described above, the force of the spring 189 begins to be applied to the spool 187 when the rod 1182 has moved near the largest reduction ratio position, the start adjustment pressure appears when the rod 1182 is disposed near the largest reduction ratio position or within an overstroke range beyond the largest reduction ratio position.

Referring to the starting valve 1116 shown in FIG. 22A, this valve is substantially the same as the counterpart used in the first embodiment but different in its connection with the associated valves.

Referring to FIGS. 22A and 22B, the starting valve 1116 comprises a valve bore 1204 formed with ports 1204*a*, 1204*b*, 1204*c*, 1204*d* and 1204*e*, a spool 1206 having thereon lands 1206*a*, 1206*b*, 1206*c* and 1206*d*, the land 1206*a* having on the lefthand end a tapered portion, and a spring 1208 biasing the spool 1206 to the right as viewed in the FIG. 22A. The port 1204*a* communicates with the oil conduit 1140 which connects via an orifice 1210 with an oil conduit 1162 forming a throttle pressure circuit. The port 1204*b* is drained through the oil conduit 1200 forming part of the drain circuit. The port 1204*c* is connected via the oil conduit 1190 with the port 186*b* and 186*d* of the start adjustment and complete engagement control valve 108 (see FIG. 22B). The port 1204*d* communicates via an oil conduit 1241 with a pitot tube 1020 which generates an engine revolution speed indicative oil pressure signal. This means that the port 1204*d* is supplied with the engine revolution speed indicative oil pressure signal. The port 1204*e* is a drain port. The ports 1204*c* and 1204*d* are provided at their inlets with orifices 1216 and 1218, respectively. The starting valve 1116 has a function to regulate an oil pressure (a start pressure) in the oil conduit 1140 to a value lower than the throttle pressure by discharging oil in the port 1204*a* toward the port 1204*b* in response to the position of the spool 1206. If the spool 1206 is disposed to the left viewing in FIG. 22A, the oil pressure in the port 1204*a* is relatively high because a clearance passage from the port 1204*a* to the port 1204*b* is narrow, while if the spool 1206 has moved to the right, the oil pressure in the port 1204*a* drops because the clearance passage from the port 1204*a* to the port 1204*b* becomes wide and thus the amount of oil drainage increases. Since the oil conduit 1162 forming the throttle pressure circuit communicates via an orifice 1210 with the oil conduit 1140 forming the start pressure circuit, the throttle pressure in the oil conduit 1162 is not substantially affected even if the oil pressure in the oil conduit 1140 drops. The spool 1206 is in its equilibium state when the sum of a rightward force by the start pressure acting on the land 1204*a*, a rightward force by the spring 1208 and a rightward force by an oil pressure (a start adjustment pressure) acting on the differential area between the lands 1206*a* and 1206*c* balances with a leftward force by oil pressure (engine revolution speed indicative pressure signal) acting on the differential area between the lands 1206*c* and 1206*d*. That is, the higher the start adjustment pressure in the oil conduit 1190, the lower the start pressure in the oil conduit 1140 becomes, while the higher the engine revolution speed oil pressure signal, the higher the start pressure becomes. Accordingly, the start pressure is controlled in response to the start adjustment pressure and engine revolution speed oil pressure signal and thus gradually increases as the engine revolution speed increases. This start pressure is supplied to a forward clutch 1004 (or a reverse clutch 1024), rendering the clutch to engage gradually, thus permitting the vehicle to start moving smoothly. As the starting of the vehicle progresses, the rod 1182 of the shift operating mechanism moves in the rightward direction owing to the action of the stepper motor 1110 and the start adjustment pressure disappears or becomes zero. As a result, the start pressure to increase rapidly. With this increase in the start pressure, the forward clutch 1004 (or the reverse clutch 1024) is securely and completely engaged and thus becomes free from a slip. Since the starting valve 1116 supplies to the forward clutch 1004 or the reverse clutch 1024 the pressure resulting from regulating the throttle pressure which represents to the engine output torque, the forward clutch 1004 and reverse clutch 1024 are prevented from being exposed to excessively higher pressure than necessary. This is advantageous for the purpose of enhancing the endurability of the forward clutch 1004 and reverse clutch 1024.

Hereinafter, a concrete description is made as to how this shift control unit 1300A controls the stepper motor 1110.

The control may be divided into a start and complete engagement control routine 500A and a stepper motor control routine 700A.

Referring to FIGS. 24(a), 24(b) and (24(c), the start and complete engagement control routine 500A is described. Like reference numerals are used to designate like steps throughout this start and complete engagement control routine 500A, the force motor control routine 500 (see FIG. 4), and the complete engagement control routine 600 (see FIGS. 5(a) and 5(b)) for ease of comparison. The start and complete engagement control routine 500A has a function to control the start pressure via the start and complete engagement control valve 108 and a starting valve 1116 so as to keep the forward clutch 1004 (or the reverse clutch 1024) in a predetermined state, such as a pre-engagement state or a slightly engaged state during idle operation of the engine when the vehicle is at a standstill, and has another function to securely engage the forward clutch 1004 (or the reverse clutch 1024) after the vehicle has started moving.

The start and complete engagement control routine 500A is now described along the steps. A throttle opening degree TH is obtained from a throttle opening degree sensor 303 shown in FIG. 23 (in step 501). A vehicle speed V is obtained from a vehicle speed sensor 302 (in step 503). Thereafter, in step 505, a determination is made whether the vehicle speed V is less than or equal to a predetermined small valve Vo or not. If V is less than or equal to the predetermined value Vo, a determination is made in step 507 whether the throttle opening degree TH is less than or equal to a predetermined small value THo or not. If TH is less than or equal to THo (that is, when the engine idles with the vehicle at a standstill), the program goes to step 1509 wherein an engine revolution speed NE is obtained from an engine revolution speed sensor 301 shown in FIG. 23. If, on the other hand, V is greater than Vo in step 505 and/or TH is greater than THo, the program goes to step 602. After obtaining the engine revolution speed NE in step 1509, a determination is made whether NE is less than or equal to a predetermined small value Nn or not (in step 1511). The predetermined value Nn represents an idle revolution speed of the engine when the engine operates in the normal stable state after its warm-up operation. If NE is less than or equal to Nn (that is, the engine is in the stable state), the program goes to step 1513 wherein a stepper motor pulse number Mo is given a value n. The value n represents a pulse number when the stepper motor 1110 assumes a rotary position at which the rod 1182 actuates or turns on a shift reference switch 1298 and has come to a boundary between a reduction ratio select range and an overstroke range. On the other hand, Mo=O means that the stepper motor 1110 assumes a rotary position at which the rod 1182 of the shift operating mechanism 1112 has moved to the leftwardmost position as viewed in FIG. 22B upto the final position of the overstroke range. If NE is greater than Nn (that is, in the case the idle revolution speed has increased as a result of the use of a choke or the use of a compressor of an air conditioner), a reference engine revolution speed NE* is given the value Nn (i.e., the normal idle state) in step 1515. An address j in the ROM 314 which corresponds to this idle state is given a number jo (in step 1517). Subsequently, the actual engine revolution speed NE is compared with the reference engine revolution speed NE* (in step 1519). If the actual engine revolution speed NE is less than or equal to the reference engine revolution speed NE*, the value of the data Mo located at the address indicated by the number jo in the ROM 314 is obtained (in step 1525) because the address in the ROM 314 where the pulse number date Mo corresponding to the actual engine revolution speed NE has been given by jo. The values of the data Mo are slightly smaller than the value n. The data Mo are stored for idle revolution speeds in the ROM 314 as shown in FIG. 26. Referring to FIG. 26, the value of the data Mo decreases as the idle revolution speed increases. If, on the other hand, the actual engine revolution speed NE is greater than the reference engine revolution speed NE*, the reference engine revolution speed NE* is increased by a predetermined value $\Delta NE^*$ (in step 1521) and the number j is increased by a predetermined value $\Delta j$ (in step 1523). Subsequently, the program returns to step 1519 wherein the actual engine revolution speed NE is compared with the reference engine revolution speed NE*. By repeating this flow (steps 1519, 1521 and 1523), the number j is given for the address where the data Mo corresponding to the actual engine revolution speed NE is stored. In this manner the data Mo corresponding to the address j is obtained and the program goes to step 602. After the data Mo have been set, the reference switch 1298 data in the previous routine is obtained. Subsequently, in step 603, a determination is made whether the shift reference switch 1298 was turned on during the preceding routine or not. If the shift reference switch 1298 was turned off in the preceding routine, a determination is made whether the shift reference switch 1298 in the present routine is turned on or not (in step 604). If it is turned on, the pulse number data M for the complete engagement is given the number Mo (in step 605) which has been set as above in step 1513 or 1525 and the program goes to step 607. If, in the step 603, the shift reference switch 1298 in the preceding routine is turned on, a determination is made whether the shift reference switch 1298 in the present routine is turned on or not (in step 606). If it is turned on, the program goes to the step 607 wherein a complete engagement on vehicle speed Von is retrieved. As described before the fact that the pulse number Mo is equal to n means that the stepper motor 1110 has moved to the rotary position when the shift reference switch 1298 is turned on, i.e, the rod 1182 of the shift operating mechanism 1112 has moved to the left as viewed in FIG. 22B and about to plunge into the overstroke range. The value of the data Mo is variable in such a manner as to cause the rod 1182 to displace in a direction to increase its overstroke as the idle revolution speed increases.

After executing step 607, the complete engagement on vehicle speed Von is compared with the actual vehicle speed V (in step 609). If the actual vehicle speed V is greater than or equal to the complete engagement on vehicle speed Von, a complete engagement flag F is given 1 in step 611, and the pulse number data Mo is given the number n in step 1613 before going to step 1631. In step 1631, a determination is made whether the pulse number data M is equal to Mo or not. If M is not equal to Mo, the program goes to step 1614. In step 1614, a determination is made whether M is less than Mo or not (in this case, whether M is less than the number n). If M is less than Mo, the program goes to step 615. In step 615, a determination is made whether a timer value T is less than or equal to zero or not. If the timer value T is greater than zero or positive, the timer value T is decreased by a predetermined value $\Delta T$ (in step 617), and the same stepper motor actuating signals as those in the preceding routine are sent out (in step 647) before returning to the START. The execution of the step 617 is repeated until the timer value T becomes zero or negative. If the timer value T has become equal to zero or negative, i.e., upon elapse of a predetermined period of time, the stepper motor actuating signals are moved by one step in an upshift direction (in step 619). The timer value T is given a predetermined positive value T1 (in step 621). The pulse number M is increased by 1 (in step 623). Then, the stepper motor actuating signals which have been moved by one step in the upshift direction are set out (in step 647) before returning to the START. Thus, the stepper motor 1110 is rotated one unit in the upshift direction. By repeating the execution of the above mentioned routine, the value M is increased. If the value M has become equal to Mo in step 1631, the program goes to step 651. If, in step 604 or 606, the shift reference switch 1298 is turned off in the present routine, the program goes to step 651.

If, in step 609, V is less than Von, a complete engagement off vehicle speed Voff is retrieved (in step 625). This retrieval substantially the same as the retrieval routine carried out in step 607 for the complete engagement on vehicle speed data (except that the stored data are different), and thus description thereof is omitted.

The complete engagement off vehicle speed data Voff that has been retrieved in step 625 is compared with the actual vehicle speed V (in step 627). If the actual vehicle speed V is less than or equal to Voff, the complete engagement flag F is given zero (in step 629) and then step 1631 is executed. If the actual vehicle speed V is greater than Voff, a determination is made whether the complete engagement flag F is zero or not (in step 633). If F is equal to zero, the program goes to the step 1631, while if F is equal to 1, the program goes to the previously described step 1613. In the step 1631, a determination is made whether the complete engagement pulse number data M is equal to Mo or not. If M is not equal to Mo, the program goes to the before mentioned step 1614 wherein a determination is made whether M is less than Mo or not. If M is less than Mo, the program goes to step 615, while if M is greater than or equal to Mo, the program goes to step 635. In step 635, a determination is made whether the timer value T is less than or equal to zero or not. If the timer value T is positive, the timer value T is decreased by a predetermined value $\Delta T$ (in step 637) and the same stepper motor actuating signals as those in the preceding routine are sent out in step 647 before returning to the START. After repeating the above flow, the timer value T is decreased repeatedly by the predetermined value $\Delta T$ so that the timer valve T becomes zero or negative upon elapse of a predetermined period of time. When the timer value T has become equal to zero or negative, the stepper motor actuating signals are moved by one step in the downshift direction (in step 641). Then, the timer value T is given the predetermined positive value T1 (in step 643), the pulse number M is decreased by 1 (in step 645), and stepper motor actuating signals which have been moved by one step in the downshift direction are sent out (in step 647) before returning to the START. As a result, the stepper motor 1110 is rotated by one unit in the downshift direction. After repeating the above mentioned routine, the value M is gradually decreased and when the value M has become equal to Mo, the program goes from step 1631 to step 651.

In step 651, a determination is made whether the complete engagement flag F is equal to 1 or not. If F is equal to 1, a determination is made whether the complete engagement pulse number M is equal to the number n or not (in step 1653). If M is not equal to n, the program returns to the START, while if M is equal to n, the program goes to step 705 of a stepper motor control routine 700A which is described hereinafter referring to FIGS. 25(a) and 25(b). This means that the stepper motor control routine 700A is executed only after the clutch has been completely engaged when M is equal to n.

Hereinafter, a description is made of the start and complete engagement control routine 500A in terms of how it works depending upon the cases it is involved. In the case the shift reference switch 1298 was turned off in the preceding routine and is turned on in the present routine (a flow along steps 603→604→605→607→609): The pulse number M is given Mo. If V is greater than or equal to Von, the stepper motor 1110 is not moved. That is, the complete engagement state of the clutch is maintained (a flow along steps 611→1613→1631→651). If V is less than Von, V is compared with Voff. If V is less than or equal to Von, the stepper motor 1110 is rotated toward the overstroke range until M becomes equal to Mo so as to release the complete engagement of the clutch (a flow along steps 625→627→629→1631→1614→635→(637)→641→643-→645→647). If V is greater than Voff (i.e., V is greater than Voff and less than Von, i.e., V is disposed in the hysterisis range), the stepper motor 1110 is rotated until M becomes equal to n (with the complete engagement maintained) if the complete engagement was maintained in the preceding routine (a flow along steps 627→633→1613→1631→1614→615→(617→619→621-→623→647). If the complete engagement was not mainatined in the preceding routine, the stepper motor 1110 is rotated (with the complete engagement released) until M becomes equal to Mo (a flow along steps 627→633→1631 and onwards). Since, as described before, the shift reference switch 1298 is designed to be turned on immediately before the rod 1182 of the shift operating mechanism 1112 enters into the overstroke range, the rod 1182 is moved to the position at which the largest reduction ratio is established during kickdown when the accelerator pedal is depressed deeply and rapidly while the vehicle is travelling, thus turning on the shift reference switch 1298. Although in this state the shift reference switch 1298 is turned on, since V is apparently greater than Von, the complete engagement state is maintained.

In the case the shift reference switch 1298 was turned off in the preceding routine and is turned off in the present routine (a flow along steps 603→604), the program goes to step 651.

In the case the shift reference switch 1298 was turned on in the preceding routine and is turned on in the present routine (a flow along steps 603→606→607): If V is greater than or equal to Von, the stepper motor 1110 is rotated until M becomes equal to n (a flow along steps 609→611→1613→1631→1614→615→(617)→619→621→623→647) so as to completely engage the clutch. When the clutch has been completely engaged, the program goes to step 651. If V is less than Von, V is compared with Voff. If V is less than or equal to Voff, the stepper motor 1110 is rotated until M becomes Mo (the complete engagement is released) (a flow along steps 627→629→1631→1614→635→(637)→641→643→645→647). If V is greater than Voff (i.e., V is greater than Voff and less than Von), the stepper motor 1110 is rotated until M becomes equal to n if the complete engagement was maintained in the preceding routine (a flow along steps 627→633→1613→1631→1614→615 and onwards). If the complete engagement was released in the preceding routine the stepper motor 1110 is rotated until M becomes equal to Mo (a flow along steps 627→633→1631→1614→635 and onwards). That is, the state in the preceding routine, i.e., the complete engagement maintained or released, is maintained.

In the case the shift reference switch 1298 was turned on in the preceding routine and is turned off in the present routine (a flow along steps 603→606), the program goes to step 651.

The condition under which the program goes from the step 1653 to the stepper motor control routine 700A is when the complete engagement is on and M becomes equal to n.

Figure 9:
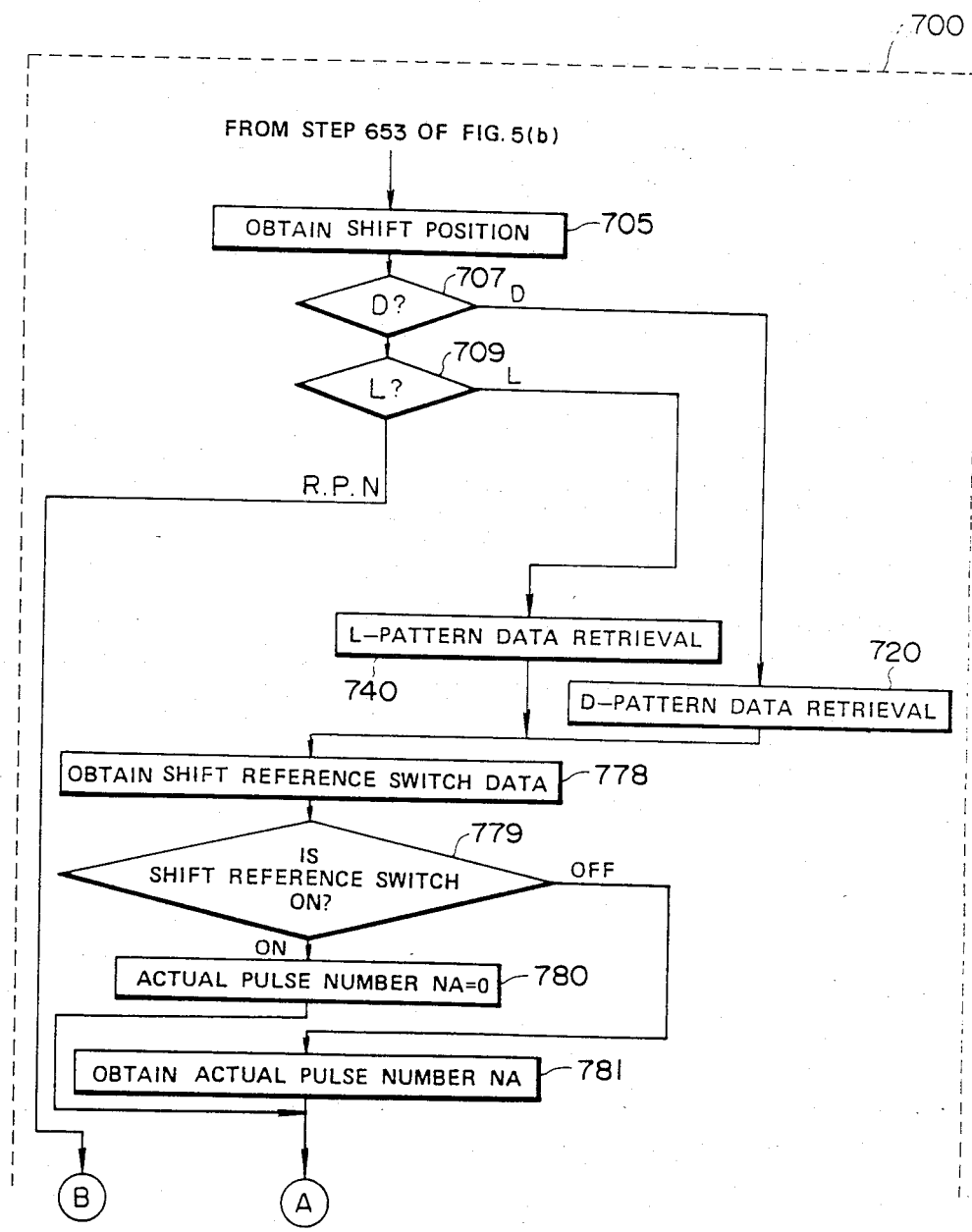
FIGS. 9(a) and 9(b), when combined, illustrate a stepper motor control routine 700.
Figure 9B:
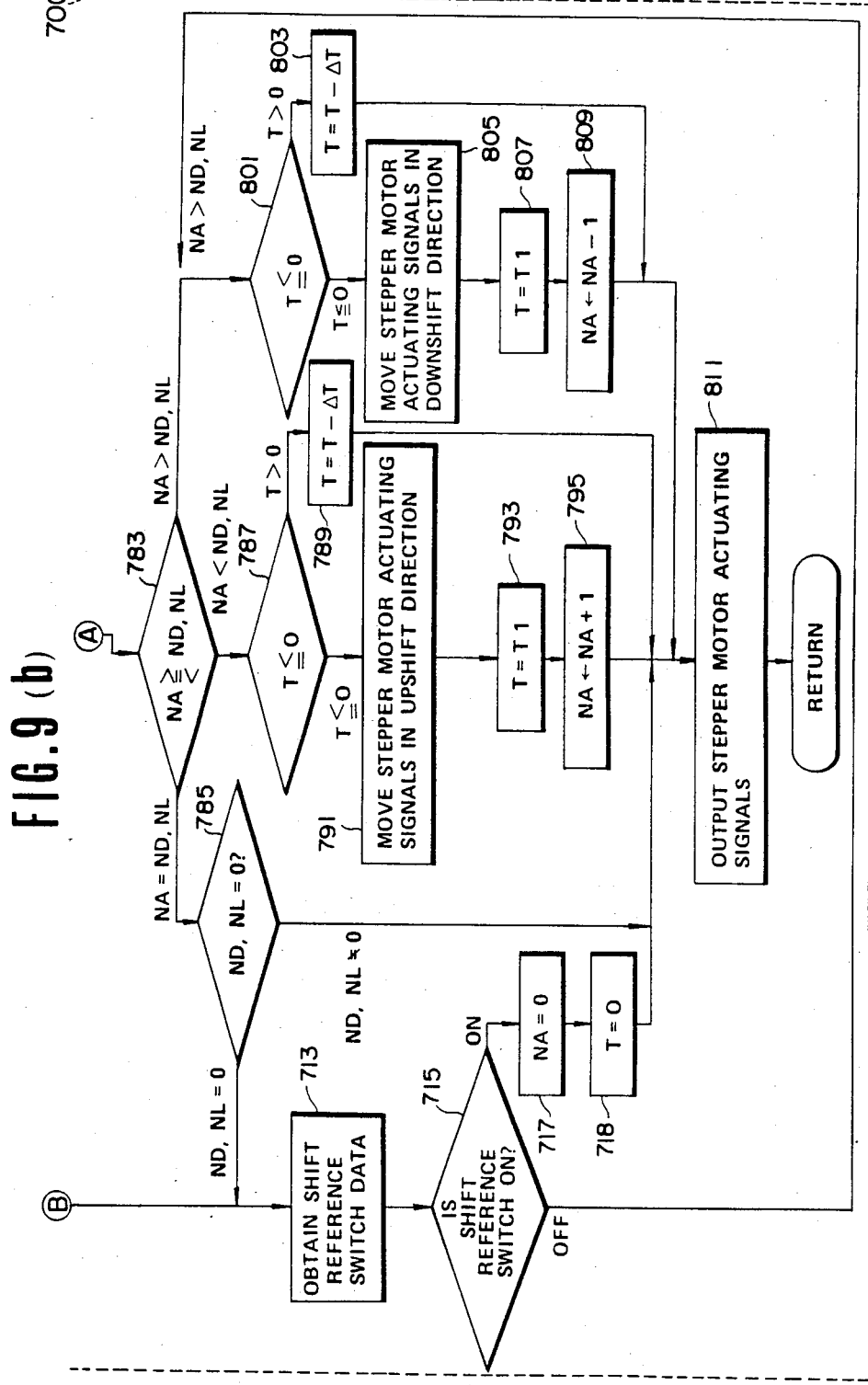
Figure 10:
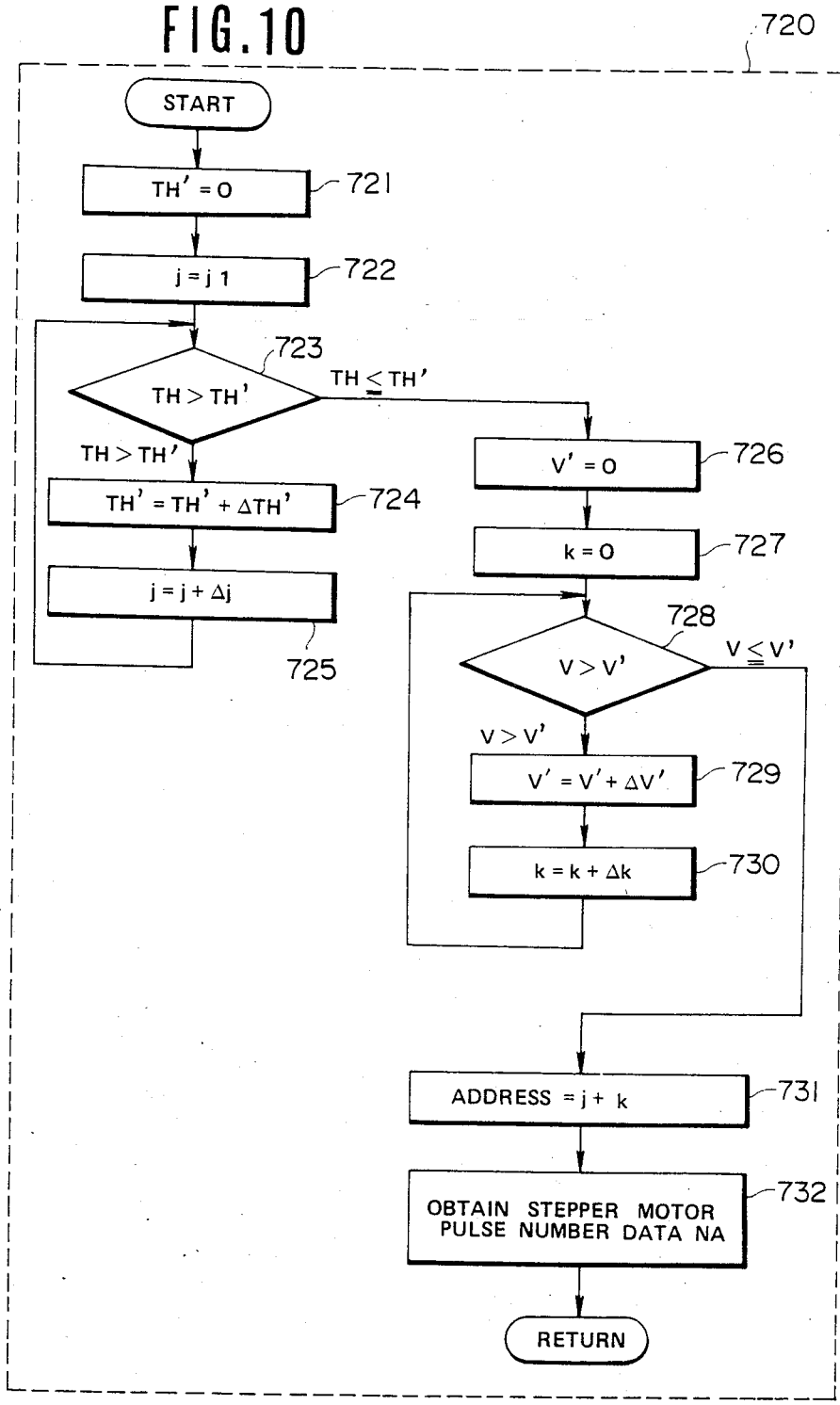
FIG. 10 is a flowchart of a D-range shift pattern retrieval routine 720.
Figure 13:
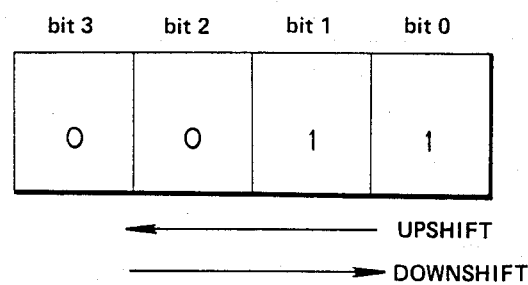
FIG. 13 is a diagrammatic view of the content of four bit positions corresponding to the mode A.
Figure 14:
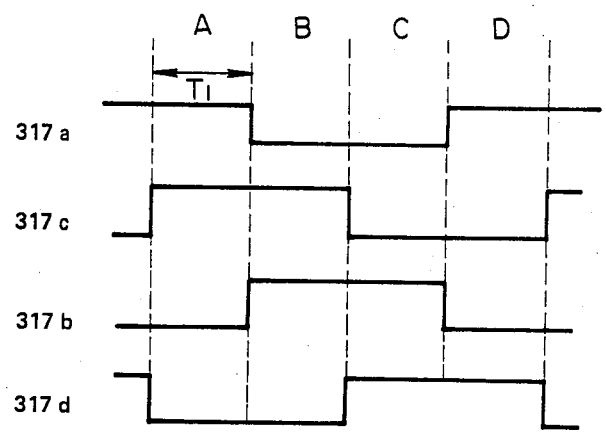
FIG. 14 is a timing diagram of the stepper motor actuating signals.

Hereinafter, the stepper motor control routine 700A for the stepper motor 1110 is described referring to FIGS. 25(a) and 25(b). Like reference numerals are used to designate like steps throughout the stepper motor control routine 700A and the stepper motor control routine 700 (see FIGS. 9(a) and 9(b)) for ease of comparison. The stepper motor control routine 700A is executed only when M is equal to n in step 1653 of the complete engagement control routine 600A (i.e., when the clutch is completely engaged). Referring to FIG. 25(a) a shift position is obtained from a shift position switch 304 (in step 705). A determination is made whether a shift position is in D position or not (in step 707). If the shift position is in D position, a D range shift pattern retrieval routine is executed (in step 720).

Referring to FIG. 25(a), if the D range position is not selected as the result of the determination in the step 707, a determination is made in step 709 whether the L range position is selected. If the L range position is selected, a L range shift pattern data retrieval routine is executed (in step 740). The L range shift pattern data retrieval routine is substantially similar to the D range shift pattern data retrieval routine 720 except that the stepper motor pulse number data NL are different from the stepper motor pulse number data ND and are stored at different addresses in the ROM 314.

After the data retrieval of the suitable pulse number data ND or NL in the corresponding step 720 or 740, a shift reference switch data is obtained from the shift reference switch 1298 in step 778 and then a determination is made whether the shift reference switch 1298 is on or off in step 779. The shift reference switch data indicates whether the shift reference switch 1298 is turned on or off. If the shift reference switch 1298 is off, the actual stepper motor pulse number data NA is retrieved from the RAM 315 in step 781. This pulse number data NA corresponds one to one to the actual rotary position of the stepper motor 1110 unless there is any electric noise. If, in the step 779, the shift reference switch 1298 is on, the pulse number data NA is given the number n in step 780A. The shift reference switch 1298 is so designed as to be turned on when the rod 1182 assumes the position corresponding to the largest reduction ratio. This results in that the rotary position of the stepper motor 1110 always corresponds to the largest reduction ratio position whenever the shift reference switch 1298 is turned on. Because the actual pulse number data NA is given zero whenever the shift reference switch 1298 is turned on, the pulse number data NA can correspond accurately to the actual rotary position of the stepper motor 1110 should there occurr a signal distortion due to electric noise. Consequently, the signal distortion due to the accumulation of noise is eliminated. Subsequently, in step 783, the actual pulse number data NA is compared with the retrieved desired pulse number data ND or NL.

Referring to FIG. 25(b), if the actual pulse number data NA is equal to the desired pulse number data ND or NL as the result of step 783, a determination is made in step 785A whether the desired pulse number ND or NL (pulse number NA) is equal to the number n or not. If the desired pulse number ND or NL is not equal to or when the reduction ratio is not the largest, the same stepper motor actuating signals as provided for in the preceding routine are sent out in step 811 before the program returns to START. If the desired pulse number ND or NL is equal to n in the step 785A, the shift reference switch data is obtained from the shift reference switch 1298 in step 713, and a determination is made whether the shift reference switch 1298 is on or off in step 715. If the shift reference switch 1298 is on, the actual pulse number data NA is given the number n in step 717A, a stepper motor timer value T is given zero in step 718, and then the same stepper motor actuating signals as those of the preceding routine which correspond to the pulse number n are sent out in step 811. If, in step 715, the shift reference switch 1298 is off, the execution of the steps following the step 801, which will be described later, begins.

If, in the step 783, the actual pulse number NA is less than the desired pulse number ND or NL, the stepper motor 1110 needs to be actuated in such a direction as to increase the pulse number. First, a determination is made whether the timer value T is less than or equal to zero or not in step 787. If the timer value T is positive, the timer value T is decreased by a predetermined value ΔT in step 789, and the same stepper motor actuating signals as those of the preceding routine are sent out in step 811 before the program returns to START. This step 789 is repeated until the timer value T becomes equal to zero or negative. When the timer value T becomes equal to zero or negative upon elapse of a predetermined period of time, the stepper motor actuating signals for the stepper motor 1110 are moved in the upshift direction by one stage in step 791. Then, the timer value T is given a predetermined positive value T1 in step 793. The stepper motor pulse number NA is increased by 1 in step 795, and the stepper motor actuating signals which have been moved by one stage in the upshift direction are sent out in step 811 before the program returns to START. This causes the stepper motor 1110 to rotate toward the upshift direction by one unit.

If, in step 783, the present stepper motor pulse number NA is greater than the desired pulse number ND or NL, a determination is made in step 801 whether the time value T is equal to zero or negative or not. If the timer value T is positive, the timer value T is decreased by the predetermined value ΔT (in step 803), and the same stepper motor actuating signals as those of the preceding routine are sent out in step 811 before the program returns to START. After repeating this flow, the timer value T becomes zero or negative upon elapse of a predetermined period of time because the decrement of the timer value T by the predetermined value ΔT is repeated. When the timer value T becomes equal to zero or negative, the stepper motor actuating signals are moved toward a downshift direction by one stage in step 805. Then the timer value T is given the predetermined positive value T1 in step 807. The stepper motor pulse number data NA is decreased by 1 in step 809, and the stepper motor actuating signals having been moved in the downshift direction are sent out (in step 811) before the program returns to START. This causes the stepper motor 1110 to rotate in the downshift direction by one unit.

As described above, the stepper motor actuating signals are in the upshift direction in step 791 when the actual pulse number, i.e., the actual reduction ratio, is smaller than the desired pulse number, i.e., the desired optimum reduction ratio. In the reverse case, when the actual reduction ratio is larger than the desired optimum reduction ratio, the stepper motor actuating signals are moved in the downshift direction in step 805. When the actual reduction ratio agrees with the desired optimum reduction ratio, the actuating signals are not moved, and the same actuating signals as those of the preceding routine are sent out.

If, in the previously described step 709 shown in FIG. 25(*a*), the L range position is not selected, i.e., if R or P or N range is selected, the execution of the step 713 and its following steps begins. The shift reference switch data is obtained from the shift reference switch 1298 in step 713 and if the shift reference switch 1298 is on, the actual pulse number NA is given the number n in step 717A and the stepper motor timer value T is given zero in step 718. Then, the same actuating signals as those of the preceding routine are sent out in step 811 before the program returns to START. If the shift reference switch 1298 is off, the steps following the step 801 are executed which have been described. That is, the stepper motor 1110 is rotated in the downshift direction. Accordingly, the largest reduction ratio is maintained when the shift position is in R or P or N.

Figure 27:
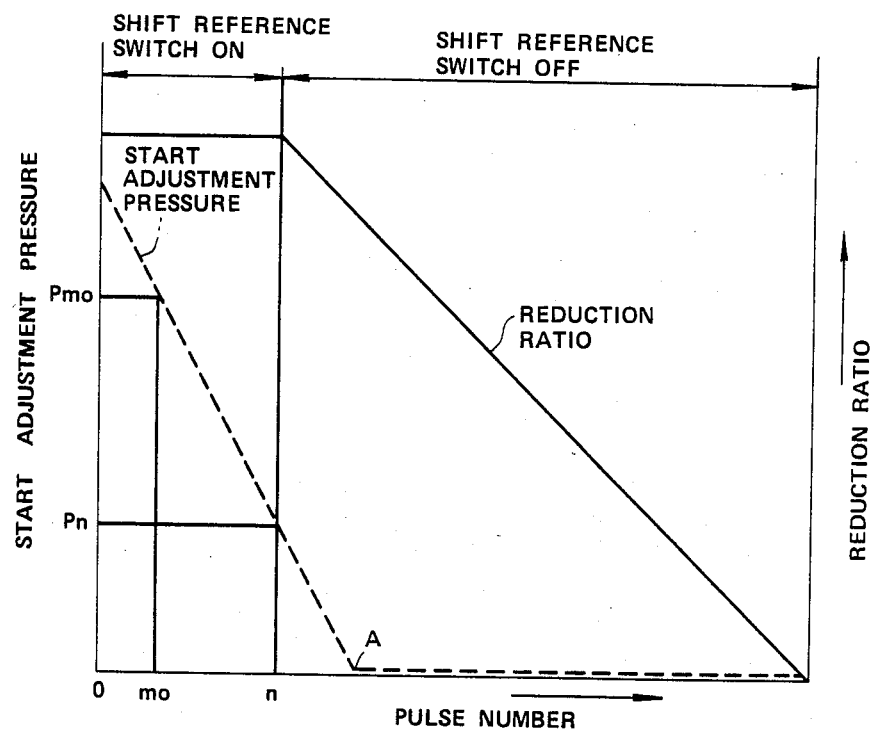
FIG. 27 is a graph illustrating a start adjustment pressure versus pulse number characteristic.

Referring to FIG. 27, a description is made how the start adjustment and complete engagement control valve 108 works under the control of the stepper motor 1110 which operates along the above mentioned start and complete engagement control routine 500A and the stepper motor control routine 700A.

Figure 15:
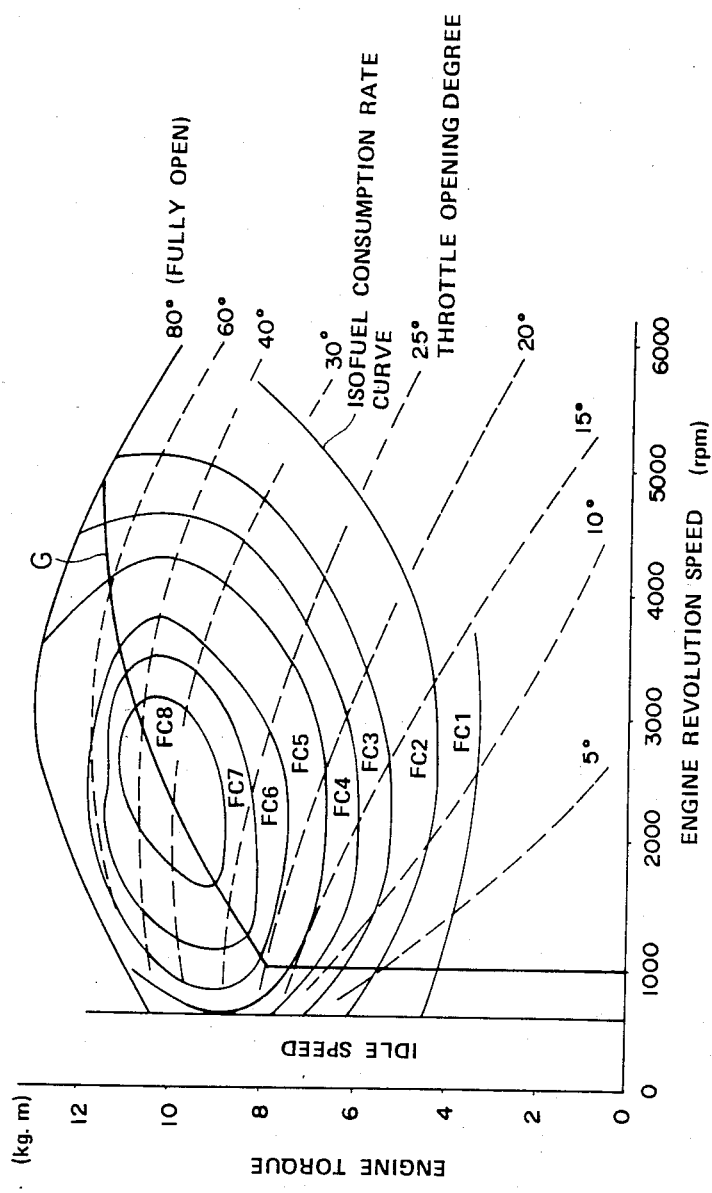
FIG. 15 is a graph showing a minimum fuel consumption rate curve G.
Figure 16:
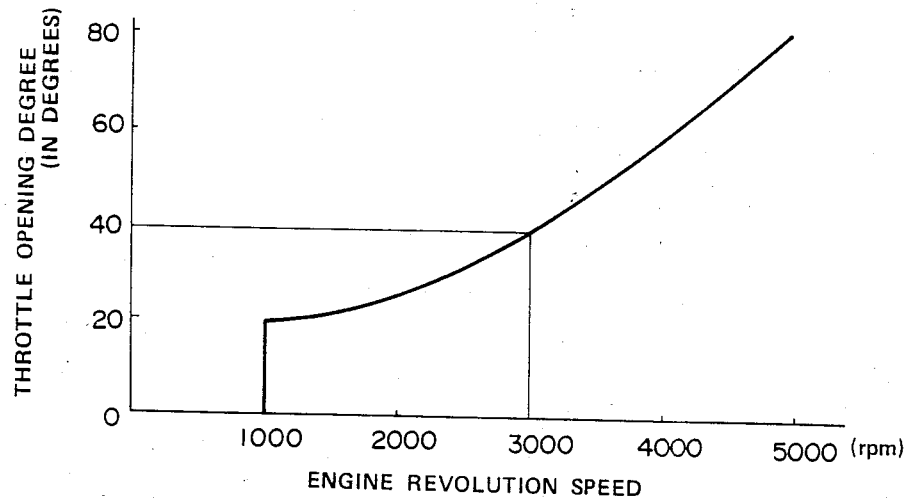
FIG. 16 is a graph showing the minimum fuel consumption rate curve expressed in terms of the throttle opening degree and engine revolution speed.
Figure 17:
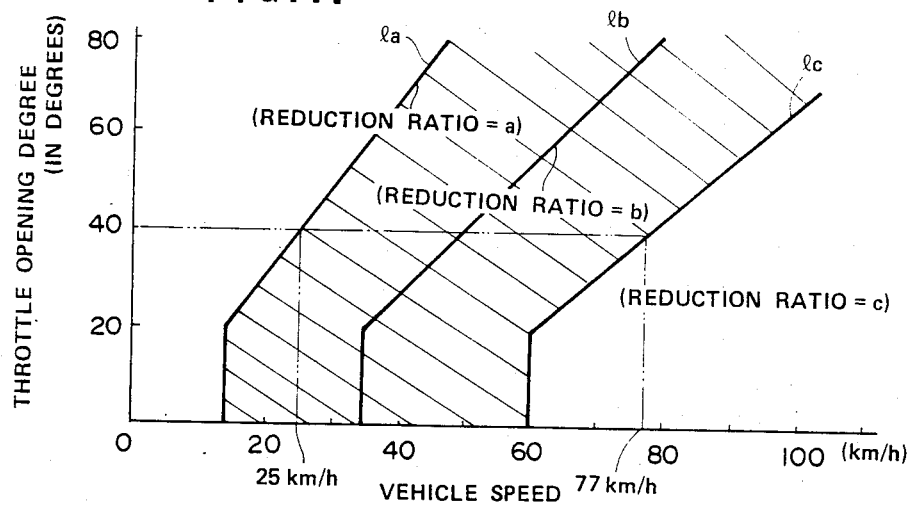
FIG. 17 is a graph showing the relationship shown in FIG. 16 expressed in terms of the throttle opening degree and vehicle speed for various reduction ratios.
Figure 18:
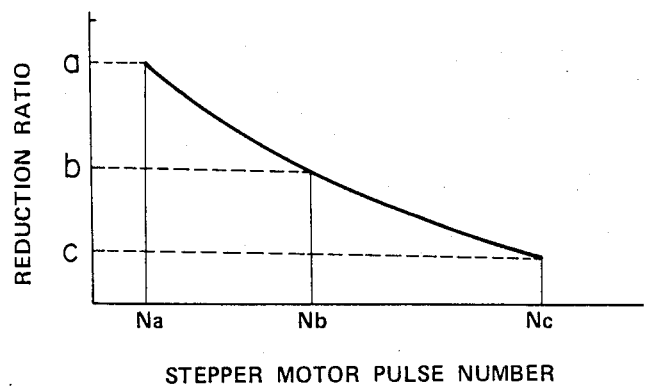
FIG. 18 is a graph showing a predetermined relationship of the reduction ratio with the stepper motor pulse number.
Figure 19:
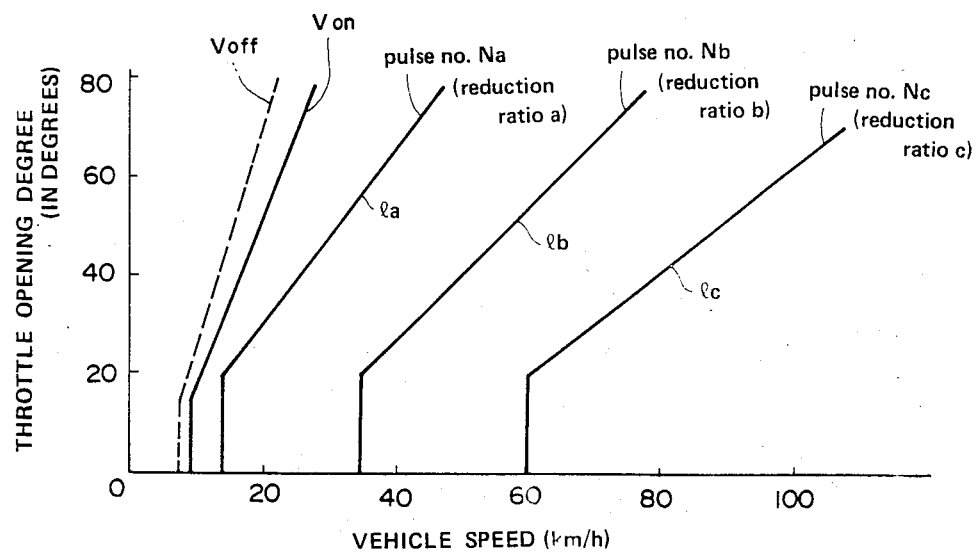
FIG. 19 is a graph showing the predetermined relationship shown in FIG. 16 expressed in terms of the throttle opening degree and vehicle speed for various pulse numbers.
Figure 20:
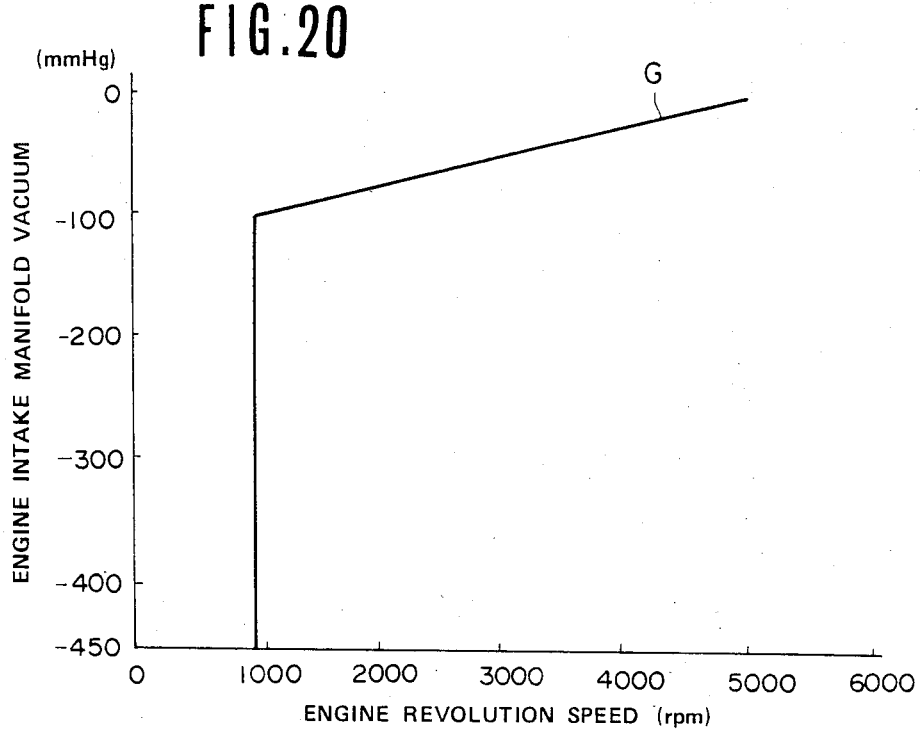
FIG. 20 is a graph showing the minimum fuel consumption rate curve expressed in terms of intake manifold vacuum and engine revolution speed.
Figure 21:
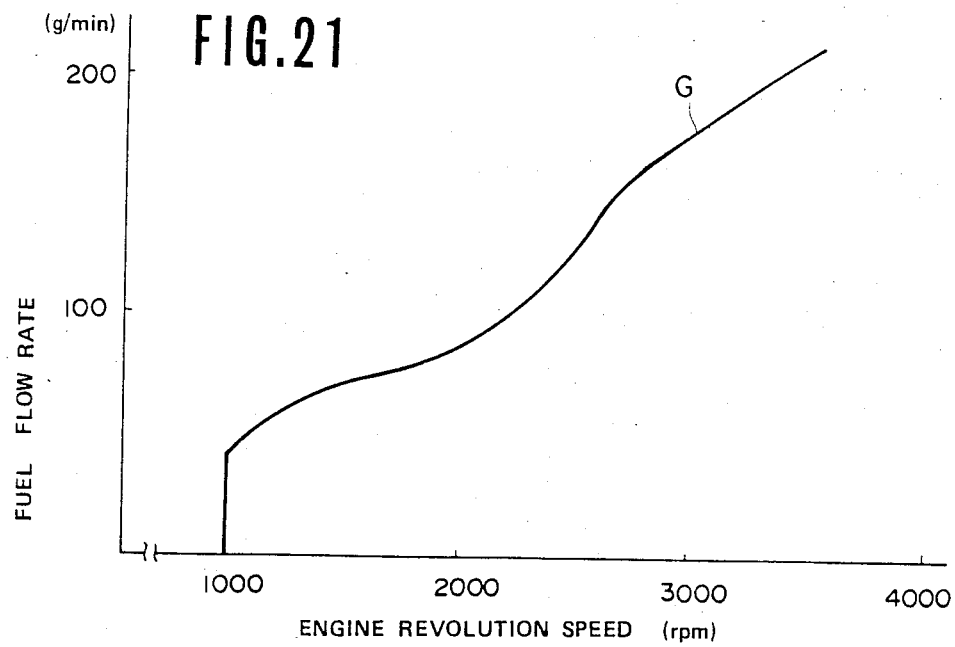
FIG. 21 is a graph showing the minimum fuel consumption rate curve expressed in terms of fuel flow rate.
Figure 23:
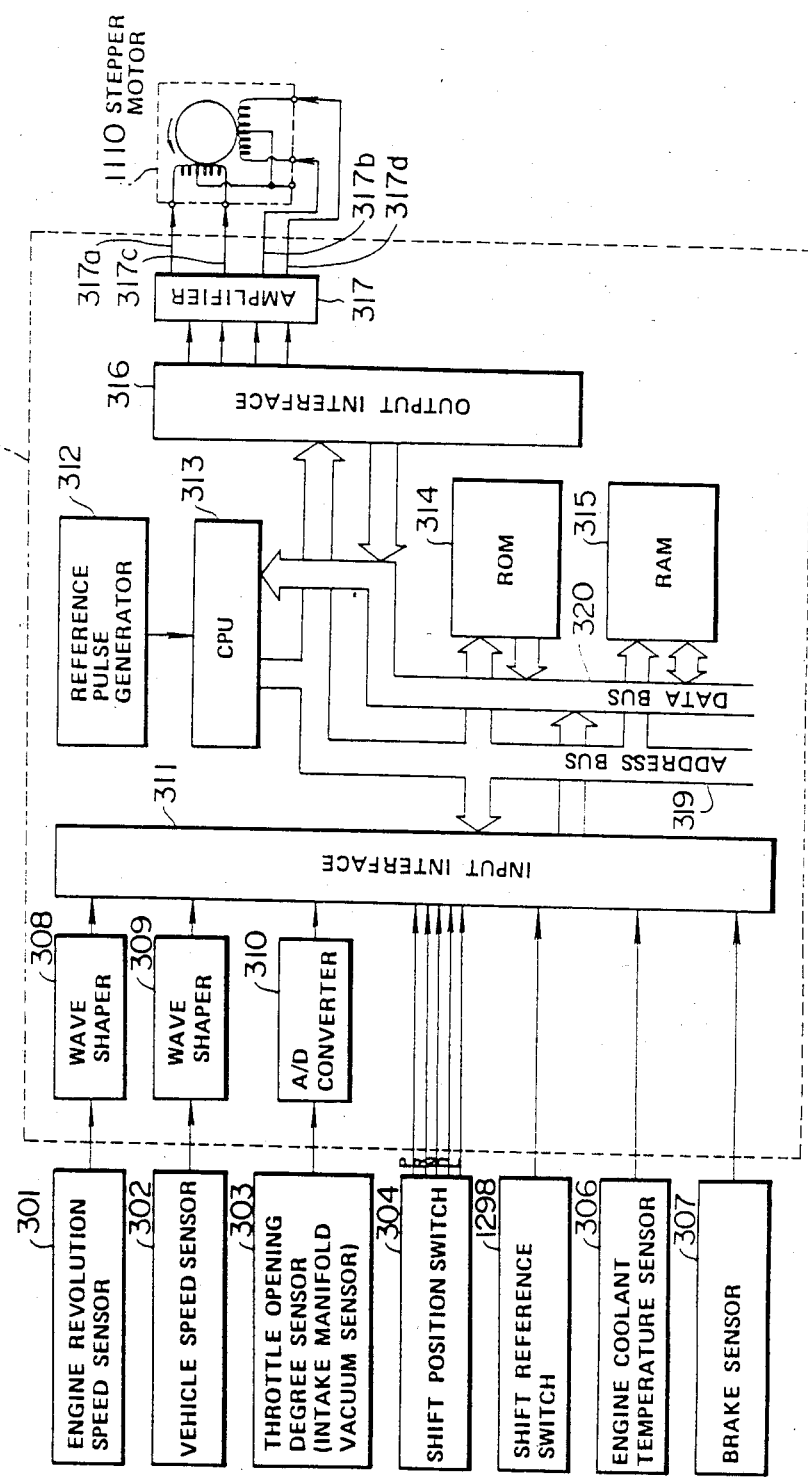
FIG. 23 is a similar view to FIG. 3 showing an electronic control unit 1300A.

FIG. 15 is a graph having the stepper motor pulse number along the ordinate and the start adjustment pressure (and reduction ratio) along the abscissa. The shift reference switch 1298 is switched when the pulse number is equal to n where the reduction ratio is the largest. If the pulse number increases above n, the rod 1182 is moved to the right as viewed in FIG. 22B and the reduction ratio becomes small. The start pressure at the pulse number n is expressed by Pn. When the start adjustment pressure Pn is given, the start pressure generated by the starting valve 116 is kept at a value (i.e., a pre-start reference pressure) with which the clutch is about to engage or in a slightly engaged state. If the engine operates in the normal stable state, the oil pressure gradually increases from this pre-start reference pressure in response to the engine revolution speed so as to gradually increase engagement of the clutch. After the vehicle has started moving, the pulse number increases and the clutch engagement force becomes the greatest at the point A. Thus, there is no fear that the clutch may slip during usable range of the engine.

If the idle revolution speed of the engine is high, the pulse number becomes a value, such as a value mo, which is smaller than n. The start adjustment pressure provided under this condition is expressed by Pmo. In this state, the start pressure is regulated to the pre-start reference pressure with which the clutch is about to engage or slightly engaged. This is because, the start adjustment pressure has increased also to compensate for an increase in the engine revolution speed fluid pressure signal (this increase resulting from the increase in idle revolution speed). When starting of the vehicle begins from this state, the start pressure is increased by an oil pressure responsive to the engine revolution speed, thus gradually engaging the clutch. When the vehicle speed exceeds the complete engagement on vehicle speed, the stepper motor pulse number switches from mo to n, causing a rapid increase in the start pressure. As a result, the clutch is completely engaged. The operation after the complete engagement of the clutch is the same as the preceding case.

After starting of the vehicle and complete engagement has been effected, the pulse number becomes greater than n, and a reduction ratio corresponding to the pulse number is obtained.

As summarized above, according to the second embodiment the control of the oil pressure (i.e., the pre-start reference pressure) supplied to the clutch before starting of the vehicle, the control of the clutch complete engagement and the shift control of the reduction ratio are controlled by the single stepper motor 1110. Another advantage of the second embodiment resides in the elimination of the start adjustment valve with the force motor.

What is claimed is:

1. A control system for a hydraulic automatic clutch of a continuously variable transmission which is shiftable into any reduction ratio between the largest reduction ratio and the smallest reduction ratio, the control system comprising:

a source of pressurized fluid;

a shift control valve communicating with said source and having a spool movable for controlling a shift between reduction ratios in the continuously variable transmission;

a shift operating mechanism including a rod movable within a first range and a second range, said shift operating mechanism including means operatively connected with said rod and said spool for controlling said spool of said shift control valve so as to continuously vary a reduction ratio between the largest reduction ratio and the smallest reduction ratio in response to movement of said rod within said first range;

control means for actuating said rod;

a starting valve having a start fluid pressure regulating state and a complete engagement fluid pressure regulating state, said starting valve supplying to the hydraulic automatic clutch a first regulated fluid pressure when it is in said start fluid pressure regulating state, said starting valve supplying a second regulated fluid pressure when it is in said complete engagement fluid pressure regulating state; and means operatively connected with said rod for rendering said starting valve operable in said start fluid pressure regulating state when said rod is disposed within said second range and for rendering said starting valve operable in said complete engagement fluid pressure regulating state when said rod is disposed in said first range.

2. A control system as claimed in claim 1, wherein said rendering means comprises a complete engagement control valve having a spool movable with said rod and said control means includes a motor operatively connected with said rod to actuate same.

3. A control system as claimed in claim 2, wherein said rendering means comprises a start adjustment valve having a force motor.

4. A control system as claimed in claim 1, wherein said rendering means comprises a start adjustment and complete engagement control valve having a spool and a spring disposed between said spool of said start adjustment and complete engagement control valve and said rod.

5. A control system as claimed in claim 1, wherein the continuously variable transmission includes a drive pulley and a driven pulley which are interconnected by a V-belt.

6. A control system as claimed in claim 5, wherein said shift control valve communicates with at least one of the drive and driven pulleys and controls a proportion of a fluid pressure supplied to one of the drive and driven pulleys to a fluid pressure supplied to the other.

7. A control system as claimed in claim 6, wherein said rendering means comprises means for generating a drive pulley revolution speed fluid pressure signal indicative of a revolution speed of the drive pulley, and a complete engagement control valve having an inlet port communicating with said generating means to receive said drive pulley revolution speed fluid pressure signal, an outlet port communicating with said starting valve, and a drain port, said complete engagement control valve including a spool integral with said rod, said spool of said complete engagement control valve being disposed in a position wherein said outlet port communicates with said drain port only when said rod is disposed within said second range and being disposed in another position wherein said outlet port communicates with said inlet port ony when said rod is disposed within said first range.

8. A control system as claimed in claim 7, wherein said rendering means further comprises a start adjustment valve which supplies a start adjustment fluid pressure to said starting valve.

9. A control system as claimed in claim 6, wherein said rendering means comprises a start adjustment and complete engagement control valve which supplies to said starting valve a start adjustment fluid pressure when said rod is disposed within said second range.

10. A control system as claimed in claim 6, wherein said start adjustment and complete engagement control valve includes a spool and a spring disposed between said spool of said start adjustment and complete engagement control valve and said rod, said spool being movable to effect pressure regulation to provide said start adjustment fluid pressure in response to the force of said spring applied to said spool of said start adjustment and complete engagement control valve.

* * * * *